United States Patent [19]

Ogura

[11] 4,452,525
[45] Jun. 5, 1984

[54] DOCUMENT FEED CONTROL DURING COPY PAPER JAMS

[75] Inventor: Tomoki Ogura, Ayase, Japan

[73] Assignee: Tokyo Shibaura Denki Kabushiki Kaisha, Kawasaki, Japan

[21] Appl. No.: 395,308

[22] Filed: Jul. 6, 1982

[30] Foreign Application Priority Data

Jul. 8, 1981 [JP] Japan .................................. 56-106506

[51] Int. Cl.³ ............................................. G03G 15/00
[52] U.S. Cl. .................................. 355/14 R; 355/3 SH
[58] Field of Search .............. 355/14 R, 14 SH, 3 SH; 271/9

[56] References Cited

U.S. PATENT DOCUMENTS

| | | | |
|---|---|---|---|
| 3,588,472 | 6/1971 | Glaster et al. | 355/14 R |
| 3,819,266 | 6/1971 | Price | 355/14 R |
| 4,157,822 | 6/1979 | Miller | 271/9 X |
| 4,332,462 | 6/1982 | Yagasaki et al. | 355/14 R |

*Primary Examiner*—R. L. Moses
*Attorney, Agent, or Firm*—Cushman, Darby & Cushman

[57] ABSTRACT

A copying apparatus has a document feeder designed to automatically feeding a document onto a document table. When, during the continuous copying operation, a copy jams occurs in the carrying path of the copy and the continuous copying operation is halted, the document feeder automatically discharges the document from the document table.

5 Claims, 25 Drawing Figures

| CYCLE / SR | 0 | 1 | 2 | 3 |
|---|---|---|---|---|
| SR0 | 1 | 0 | 0 | 0 |
| SR1 | 0 | 1 | 0 | 0 |
| SR2 | 0 | 0 | 1 | 0 |
| SR3 | 0 | 0 | 0 | 1 |

| CYCLE / SR | 0 | 1 | 2 | 3 | 4 |
|---|---|---|---|---|---|
| SR0 | 1 | 1 | 0 | 0 | 0 |
| SR1 | 0 | 1 | 1 | 0 | 0 |
| SR2 | 0 | 0 | 1 | 1 | 0 |
| SR3 | 0 | 0 | 0 | 1 | 1 |

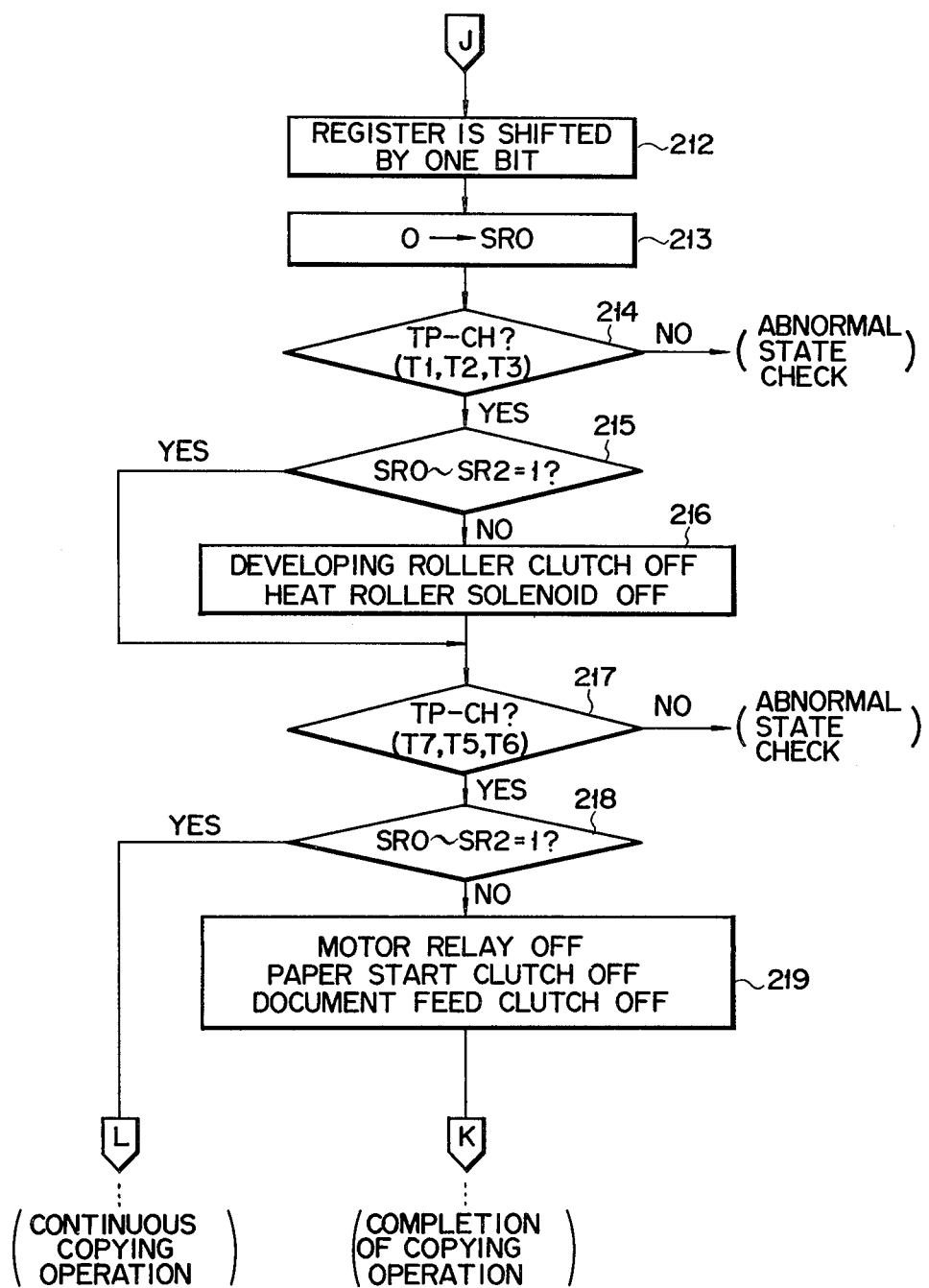

DOCUMENT FEED CONTROL DURING COPY PAPER JAMS

BACKGROUND OF THE INVENTION

This invention relates to an electrographic copying apparatus which is equipped with an automatic document feeder and an automatic sorter.

In a conventional electrographic copying apparatus equipped with an automatic document feeder and sorter, when a paper jam occurs in the paper passage of the automatic sorter, a jammed paper is first removed and the copying operation is then restarted. At this time, however, the document previously fed onto a document table by an automatic document feeder remains on the document table. The automatic document feeder detects the loading of the document and, operating in response to this detection, starts the copying operation accordingly. In the prior art, therefore, when it is desired, upon the occurrence of such a paper jam, to continue copying the document remaining on the document table, it is necessary either to push a copying start key of the copying apparatus, or to take the document out of the document table and reload it onto the automatic document feeder. The conventional electrographic copying apparatus, therefore, has low efficiency in connection with paper jam, failing to carry out the speedy copying operation.

SUMMARY OF THE INVENTION

Accordingly, the object of the present invention is to provide an electrographic copying apparatus which is improved in efficiency in connection with the occurrence of a paper jam.

According to the present invention, an electrographic copying apparatus is provided which comprises paper jam detecting means for detecting a paper jam which occurs while a continuous copying operation is carried out through the automatic feeding of documents by an automatic feeder, and means for halting the copying operation and discharging automatically the document from the document table in response to the detection of the paper jam by the paper jam detecting means.

BRIEF DESCRIPTION OF THE DRAWING

FIGS. 13A to 13I are flow charts of the copying apparatus shown in FIG. 1; and

DETAILED DESCRIPTION OF THE PREFERRED EMBODIMENT

Figure 1:
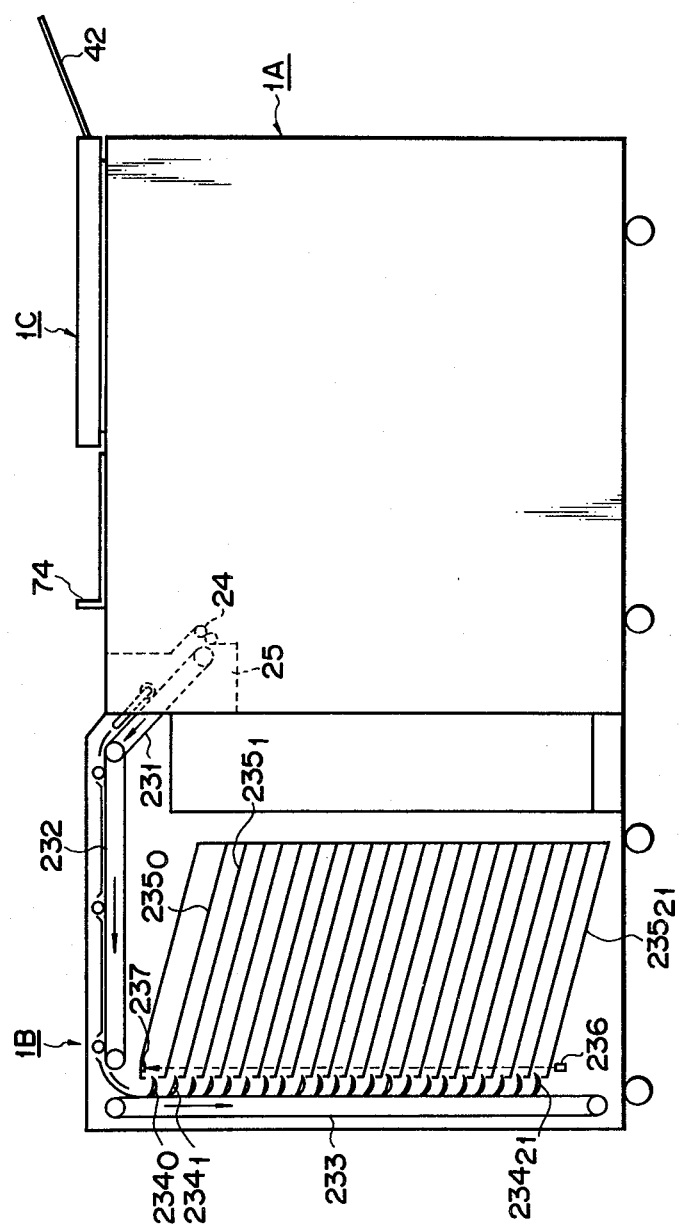
FIG. 1 is a side view of an electrographic copying apparatus according to an embodiment of the invention.
Figure 2:
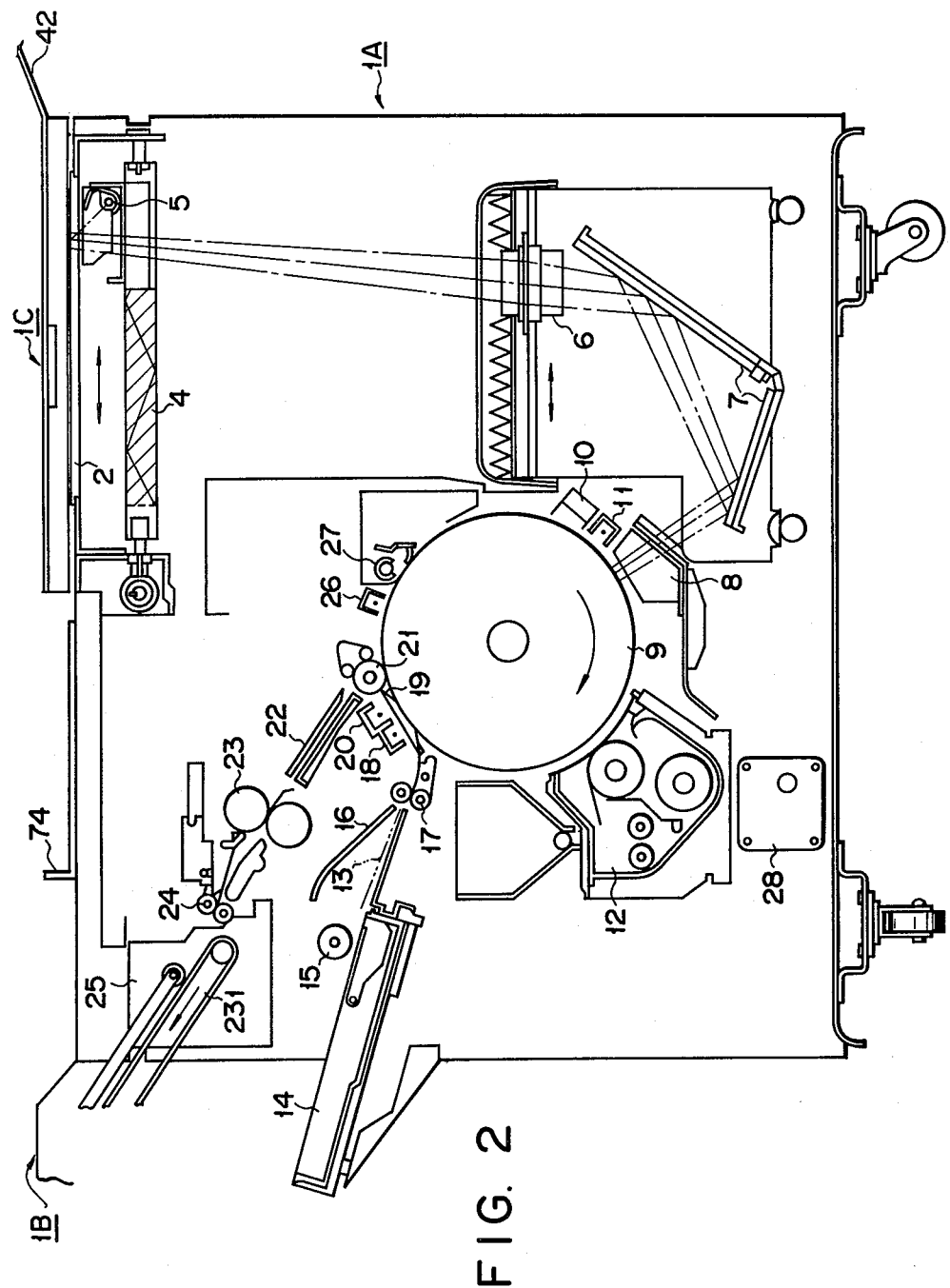
FIG. 2 is a side view of the interior of the electrograhic copying apparatus shown in FIG. 1.

According to an electrograhic copying apparatus shown in FIG. 1, at the side of a copying console 1A an automatic copy sorter 1B is provided, and on the top thereof an automatic document feeder 1C is disposed. Inside the copying console 1A, a document table 2 is disposed in such a manner that it faces the document feeder 1C as shown in FIG. 2. The document feeder 1C is constructed openably from the document table 2. Below the document table 2 a light exposure lamp 5 is provided, which is caused to make a reciprocating movement by a cam shaft 4 as indicated by the arrow in FIG. 2. When the light exposure lamp 5 is moved, the light therefrom is allowed to illuminate a document through the document table 2. The light reflected from the document is made incident upon a lens 6 which is caused to make a reciprocating movement similarly to the light exposure lamp 5. The light passed through the lens 6 is reflected by a mirror 7 toward an exposure slit member 8. To this light passed through the exposure slit member 8 is exposed a photoconductive drum 9, which is rotating as indicated by the arrow. The surface of the photoconductive drum 9 is previously discharged by a discharge lamp 10 and then charged by a charging charger 11. The surface of the photoconductive drum 9 thus charged is exposed to the light passed through the exposure slit member 8 with the result that a latent image is formed on that surface. The latent image thus formed is developed by a developer 12 with the result that a toner image is formed on the drum surface.

A sheet of paper 13 is taken from a paper feed cassette 14 by a paper feed roller 15 and is delivered by a pair of aligning rollers 17 to a transfer section through a guide way 16. In the transfer section, the paper is cohered by a transferring charger 18 onto the photoconductive drum 9 and as a result the toner image on the photoconductive drum 9 is transferred onto the paper 13. After the transfer, the paper 13 is separated from the surface of the photoconductive drum 9 by a separating tape 19 and a separating charge 20, and is turned by a turn roller 21, and is then guided into a guide passage 22. The paper 13 passed through the guide passage 22 is introduced between heat rollers 23 serving as a fixer, and the toner image is fixed to the paper 13. This fixed toner paper, i.e. copy paper is discharged or released by a pair of paper discharge rollers 24 into a paper discharge section 25, and is guided to a feed section 231 as described later. It is to be noted here that after the transfer the photoconductive drum 9 is charged by a charge removal charger 26 so as to have the opposite polarity, so that the surface of the photoconductive drum 9 is discharged. Thereafter, the residual toner on the drum surface is removed by a cleaner 27.

The above-mentioned series of copying operations are carried out by the driving, through a transmission mechanism, of the cam shaft 4, lens 6, photoconductive drum 9, developer rollers of developer 12, paper feed rollers 15, aligning rollers 17, turn roller 21, heating roller of heat rollers 23 i.e. fixer and paper discharge rollers 24 by a motor 28 provided inside the copying console 1A. Further, the motor 28 is also used to drive a driving mechanism for the document feeder 1C as described later.

As shown in FIG. 1, the automatic copy sorter 1B is connected, at the left side of the copying console 1A, to the paper discharge section 25. The feed section 231 receives the copy carried into the paper discharge section 25 from the fixer and carries it in the arrow-indicated direction. The copy carried from the feed section 231 is carried by a horizontal conveyer 232 in the arrow-indicated direction. A vertical conveyer 233 is used to carry the copy which has been carried thereto by the horizontal conveyer 232, in the arrow-indicated vertical direction. Along the vertical conveyer 233, regulating pawls $234_0$, $234_1$ to $234_{21}$ are arranged vertically. Correspondingly to the regulating pawls $234_0$, $234_1$ to $234_{21}$, trays $235_0$, $235_1$ to $235_{21}$ are juxtaposed therewith. Thus, during the continuous copying operation, the copies sequentially carried to the vertical conveyer 233 are guided into the trays by the corresponding regulating pawls which are selectively driven and displaced, and are received in the trays. When the copies are carried into the trays, they are sensed by a copy detector comprised of a light source 236 and an optical sensor 237 and are counted in accordance with the detection signal of the optical sensor 237.

Figure 3:
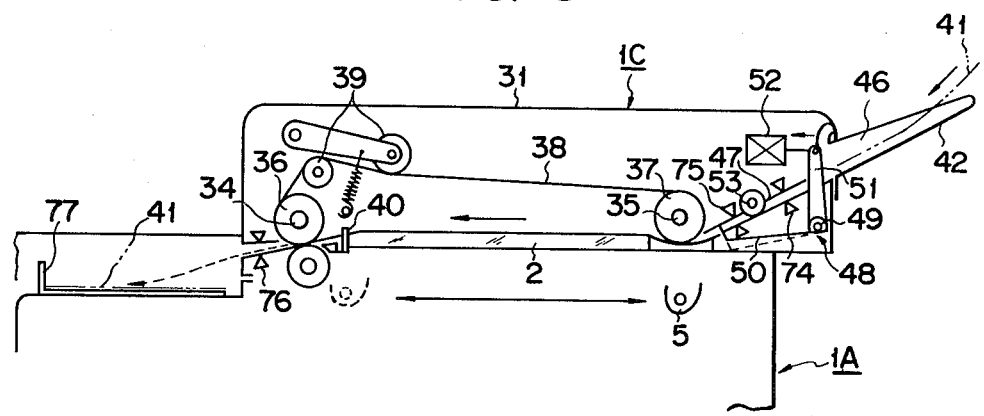
FIG. 3 is a schematic side view of an automatic document feeder incorporated in the copying apparatus shown in FIG. 1.
Figure 4:
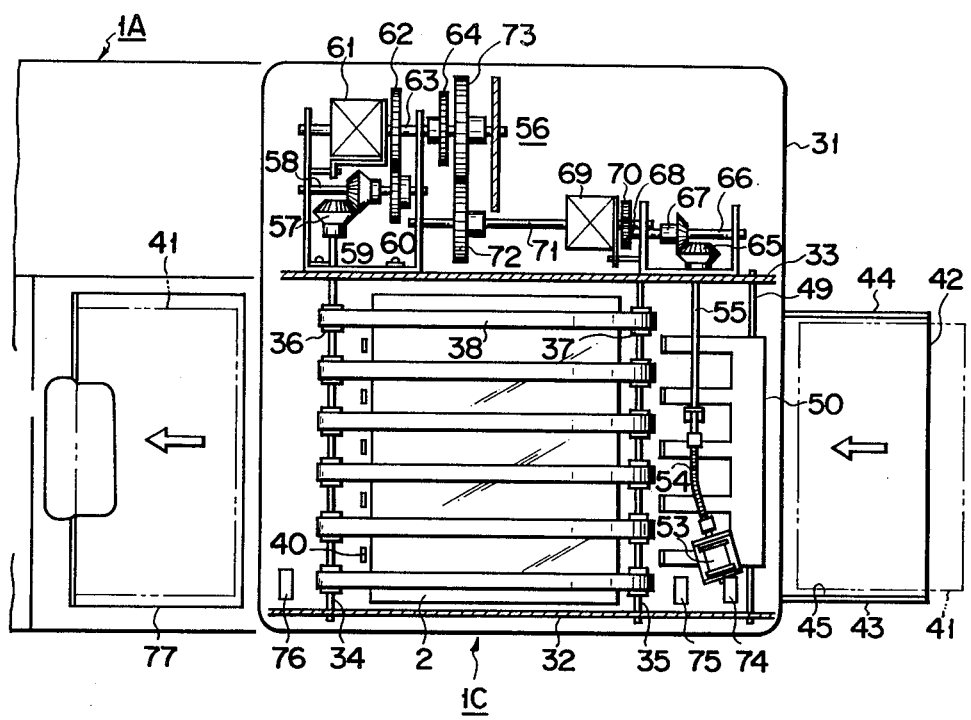
FIG. 4 is a top view of the interior of the automatic document feeder shown in FIG. 3.

The automatic document feeder 1C is constructed as shown in FIGS. 3 and 4. That is, within a housing 31 a front frame 32 and a back frame 33 are disposed in parallel with each other. Between the frames 32 and 33 a drive shaft 34 and a driven shaft 35 are installed in parallel with each other. A plurality of rollers (36, 36, . . .) and (37, 37, . . .) are fitted at intervals on the drive shaft 34 and driven shaft 35, respectively. Between each one of the rollers 36, 36, . . . and a corresponding one of the rollers 37, 37, . . . a conveyer belt 38 is stretched. When the conveyer belts 38 are allowed to travel, while sliding, over the document table 2 in accordance with the rotation of the drive shaft 34, the document introduced between the document table 2 and the conveyer belts 38 is carried to and from the document table 2. At this time, a tension is imparted to the conveyer belts 38 by a tension mechanism 39. Document stoppers 40, 40, . . . are provided at the paper discharge side of the document table 2 so that they may be protruded onto and retracted from the document table 2, and stop the document at their regulating position. It is to be noted here that those document stoppers 40 are driven by a solenoid not shown.

At the right side of the housing 31 there is provided in protruded form a document guide member 42 for guiding the document, at both side, of which are provided a front frame 43 and a back frame 44. The inner face of the front frame 43 serves as a reference face for aligning the document 41. The document 41 guided by the document guide member 42 is introduced into a guide way 47 through an opening 46 formed in the right side face of the housing 31, and, passing through the guide way 47, is guided between the conveyer belt 38 and the document table 2. At the outlet of the guide way 47 is provided a document stopper mechanism 48 for temporarily stopping the document 41. The document stopper mechanism 48 is comprised of a stop lever 50, a drive arm 51 and a drive solenoid 52. One end of the stop lever 50 is supported on a shaft 49 and therefore the stop lever is rockably about the shaft 49. Thus, the other end or tip end of the stop lever 50 is made protrucible into and retractible from the outlet of the guide way 47. On the supported portion of the stop lever 50 there is fixed one end of the drive arm 51, to the other end of which is connected a plunger of the solenoid 52. At the mid-way of the guide way 47, a horizontally inclined aligning roller 53 is provided closely to the front frame 32 and stop lever 50. This inclined aligning roller has a rotating shaft inclined at a specified angle from a right lower position to a left upper position of the illustration and rotatably held by a holding member not shown.

When the tip end of the document 41 is guided by the paper guide member 42 and is introduced into the guide way 47, that tip end is brought into rolling contact with the inclined roller 53, and thus the document is carried to a reference face 45 of the paper guide member 42 and also to the stop lever 50. When the tip end of the document 41 is allowed by the inclined roller 53 to abut against the tip end portion of the stop lever 50, the document 41 is aligned. The rotating shaft of the inclined roller 53 is connected to the tip end of a drive shaft 55 through a joint spring 54 and is made rotatable in accordance with the rotation of this drive shaft 55. The drive shaft 55 is installed between the back frame 33 and a holding frame (not shown).

The drive shafts 34 and 55 are rotated by a drive mechanism 56 provided outside the back frame 33. That is, one end of the drive shaft 34 is fitted to a driven bevel gear 59 fitted to one end of a rotating shaft 58. To the other end of the rotating shaft 58, a driven gear 60 is fitted, with which a drive gear 62 fixed to a drive section of an electromagnetic clutch 61 is intermeshed. The electromagnetic clutch 61 is a document feeding clutch and a driven section thereof is fixed to a rotating shaft 63. Onto this rotating shaft 63, a sprocket 64 is fitted, which is connected to the motor 28 provided in the copying console 1A, through a transmission member such as a chain not shown.

Onto one end of the drive shaft 55 is fitted a driven bevel gear 65, which is intermeshed with a drive bevel gear 67 fitted onto a rotating shaft 66. Onto the rotating shaft 66 is fitted a driven gear 68, which is intermeshed with a drive gear 70 fixed to the drive section of an electromagnetic clutch 69. This clutch serves as a document feeding clutch and is hereinafter called as such. Onto the driven section of the electromagnetic clutch there is fixed a rotating shaft 71, onto which a driven gear 72 is fitted. The driven gear 72 is intermeshed with a drive gear 73 fitted onto the said rotating shaft 63. Thus, the rotating power of the motor 28 is transmitted to the driven gear 72.

Provided closely to the entrance of the guide way 47 is an optical sensor 74 which is designed to optically sense the document 41 loaded into the guide way 47, and which is hereinafter called a document feed switch. Provided at the exit portion of the guide way 47 and in front of the tip end portion of the stop lever 50 is an optical sensor 75 which is designed to optically sense the document 41 carried on, and which is hereinafter called a document start switch. Further, provided forwardly of the terminal carry end of the conveyer belts 38 is an optical sensor 76 which is designed, when the document 41 to be discharged from the document table 2 has been jammed in the guide way 47, to optically sense the jammed document. This sensor is hereinafter called a jam detecting switch.

The automatic document feeder 1C constructed as above is attached to the copying console 1A by means of a hinge mechanism (not shown) made rockable about the rotating shaft 63, and thus is made openable with respect to the document table 2, namely, made openable from the same. A document stopper 77 is for the purpose of receiving the document 41 discharged from the document table 2 and is provided at the discharge side of the document table 2 and on the copying console 1A.

Figure 6:
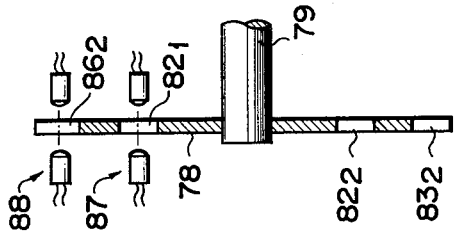
FIG. 6 is a side view of the timing disc.
Figure 5:
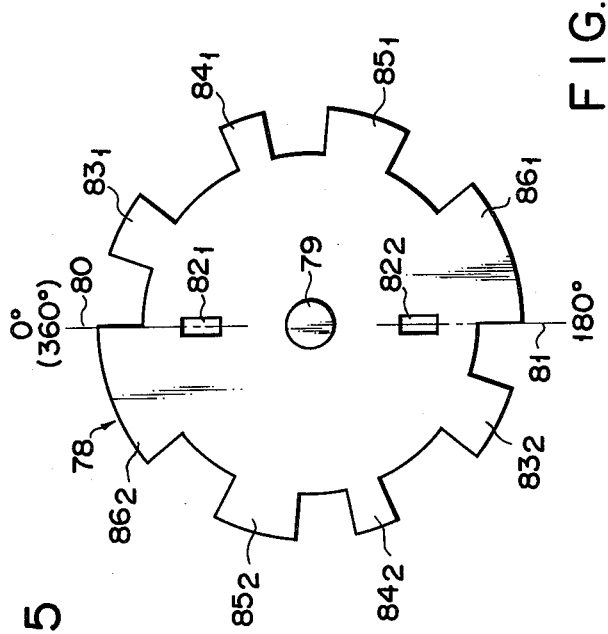
FIG. 5 is a plan view of a timing disc.
Figure 7:
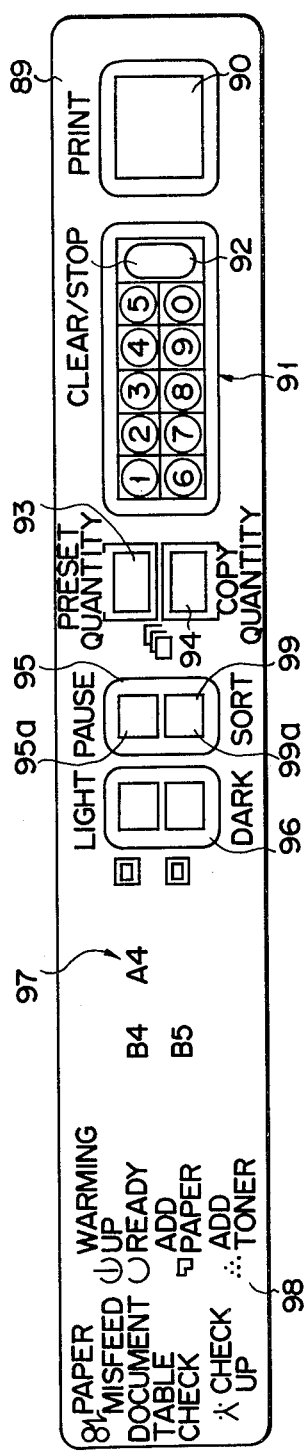
FIG. 7 is a plan view of an operating panel.

FIGS. 5 and 6 show a timing disc 78 for obtaining the timing signals necessary to carry out the copying operation of the invention. The timing disc 78 is directly connected to the rotating shaft of the photoconductive drum 9 shown in FIG. 2 through a rotating shaft 79. The timing disc 78 is provided with signal apertures $82_1$ and $82_2$ in the opposed radial directions, i.e. in the angular positions of 0° and 180° as taken when the position of a straight line 80 defines an angle of 0° (360°) and the position of a straight line 81 an angle of 180°. These signal apertures $81_1$, $82_2$, are used to obtain the reset pulses indicating the position of the timing disc 78 (position of the photoconductive drum 9). On the outer peripheral edge of the timing disc 78, signal plates ($83_1$, $84_1$, $85_1$, $86_1$) and ($83_2$, $84_2$, $85_2$, $86_2$) are provided at specified angular positions in the radially protruded form and in turn from the angular positions of 0° and 180°, respectively. In this case, as seen in FIG. 5, the signal plates ($83_1$, $84_1$, $85_1$, $86_1$) and ($83_2$, $84_2$, $85_2$, $86_2$) are made symmetrical with each other. The signal plates ($83_1$ to $86_1$) and ($83_2$ to $86_2$) are used to obtain the timing signals for controlling the actual operation. Thus, in the proximity of the outer peripheral edge portion of the timing disc 78 are provided an optical sensor 87 for optically sensing the signal apertures $82_1$, $82_2$ and an optical sensor 88 for optically sensing the signal plates $83_1$ to $86_1$, $83_2$ to $86_2$. In FIG. 7, a control panel 89 of the copying apparatus is shown. On the right side portion of this control panel 89, a start button key 90 and a ten key unit 91 are juxtaposed with each other. In the ten key unit 91, a clear/stop key 92 is provided which is used to clear a set data and temporarily stop the copying operation. At the left side of the ten key unit 91, displays 93 and 94 are provided. The display 93 is designed to digitally display the set number of sheets of paper to be copied which is set by the ten key unit 91, while the display 94 to display the number of the sheets of paper actually copied. An interruption key 95 is used to make an interruption in the course of the copying operation. When this interruption key is depressed, a display lamp 95a incorporated therein is lit. A dark/light setting key 96 is operated depending upon the contrast of the document. A size display section 97 is designed to display, for example, A4, B4, B5, ... correspondingly to the size of a paper on which the original document is to be copied. A status display section 98 is designed to display the operational status of the copying apparatus such as paper jam, document table check, sorter check, check up, warming up, ready, addition of paper, addition of toner, etc. A sorting key 99 is actuated when a sorting request is made to the automatic copy sorter 1B. When this sorting key is depressed, so sorting lamp 99a is lit.

Figure 8A:
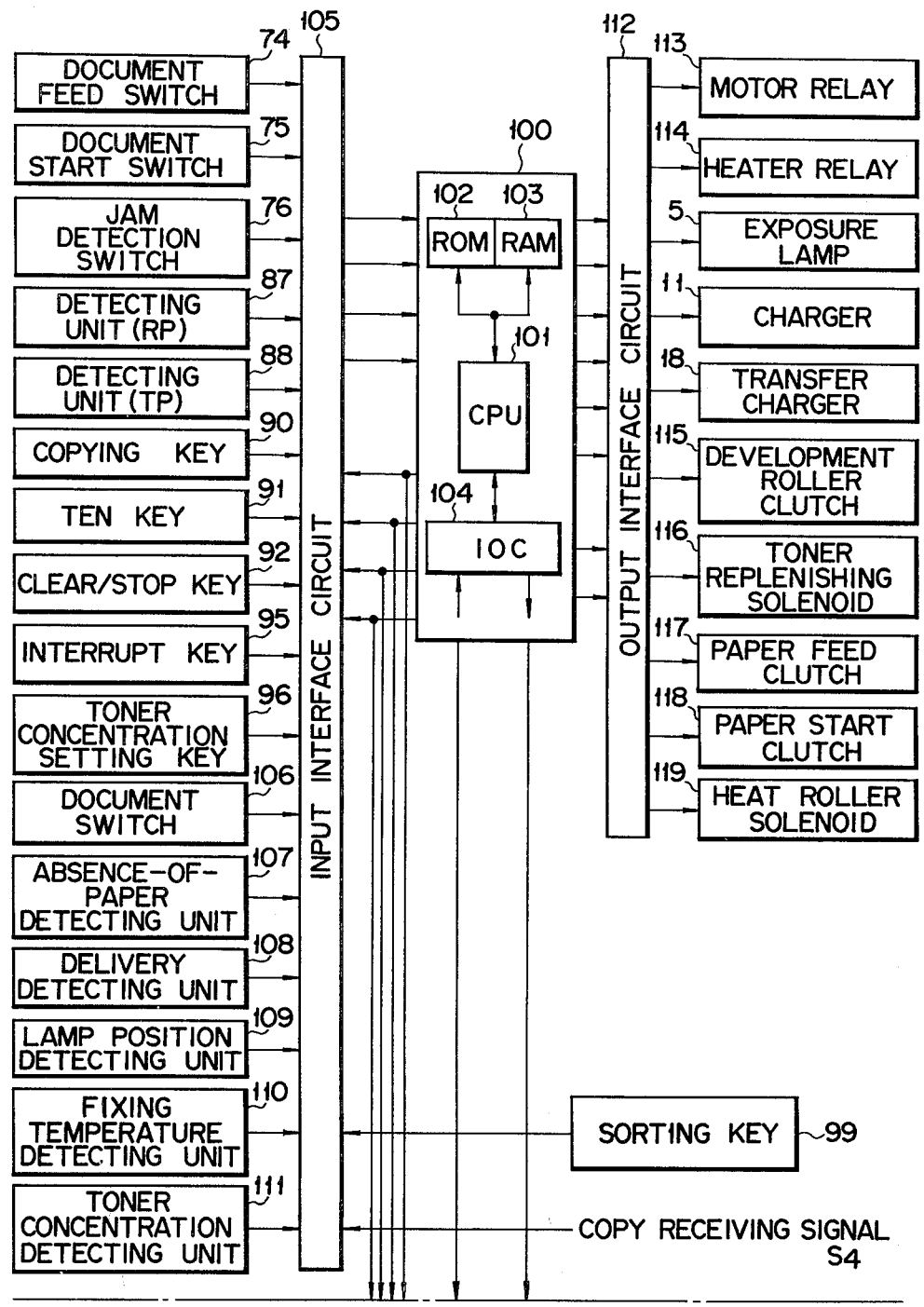
FIGS. 8A and 8B are block circuit diagrams of the copying apparatus shown in FIG. 1.
Figure 8B:
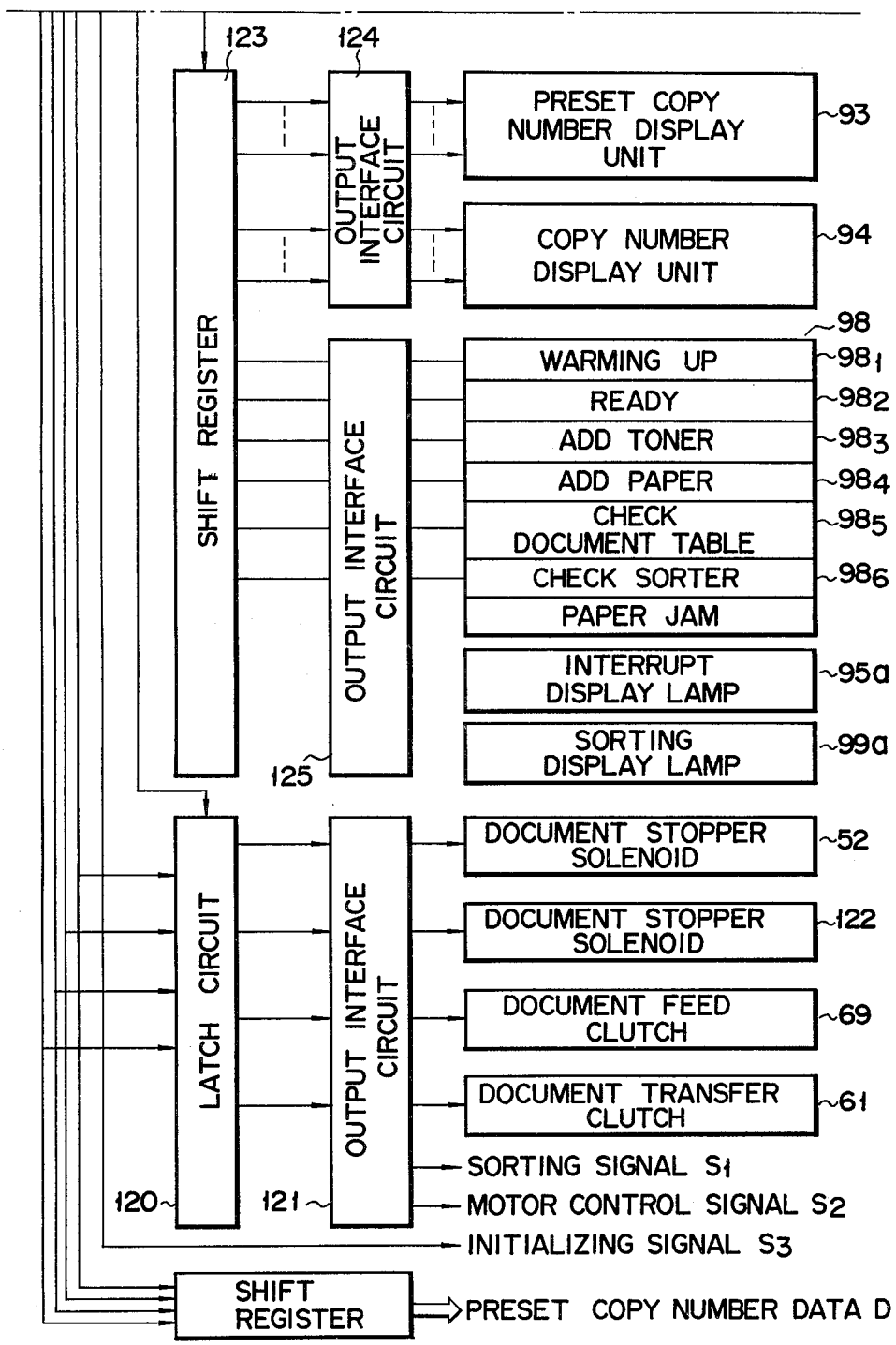

The control system for the copying apparatus will now be described with reference to FIGS. 8A and 8B. A microprocessor 100 is comprised of a central processing unit 101 (hereinafter referred to simply as CPU) for controlling the whole operation of the copying apparatus, a read only memory 102 (hereinafter referred to simply as ROM) in which there are stored the operational sequence program and the like for the processing sections intended to perform the processing operations such as the document feeding, copy feeding and carrying, charging, exposure, developing, and fixing a random access memory 103 (hereinafter referred to simply as RAM) in which are stored data required to be used in CPU 101, and an input/output control section 104 (hereinafter referred to simply as IOC) for making an input/output control of the signal or data. To this microprocessor 100 is connected an input interface circut 105 for selecting the input to the microprocessor, to which are connected said document feed switch 74, document start switch 75, jam sensing switch 76, optical sensors or detecting units 87, 88, copying key 90, ten keys 91, clear stop key 92, interrupt key 95, dark/light setting key 96, sorting key 99 and the like. To the interface circuit 105 are also connected a document switch 106 which is turned on when the automatic document feeder 1C has been closed, an absence-of-sheet detecting unit 107 for detecting the absence of sheets in the paper feed cassette 14, a paper discharge detecting switch or delivery detecting unit 108 for the discharge or delivery of copy paper 13 into the paper discharge section 25, a lamp position detecting unit 109 for detecting the position of the exposure lamp 5, a fixing temperature detecting unit 110 for detecting the temperature of the heat roller 23, and a toner concentration detecting unit 111 for detecting the toner concentration in the developer 12. The input interface circuit 105 is used to select, for each predetermined group, the input signals from the switches or keys in accordance with a selective signal of code (1, 2, 4, 8) supplied from the microprocessor 100 and convert the input signal thus selected into a binary coded signal of "1" or "0".

To the microprocessor 100 is connected an output interface circuit 112 for driving the external appliances equipped to the copying apparatus. That is, to the output interface circuit 112 are connected the exposure lamp 5, charging charger 11, and transferring charger 18, respectively. Further, to the output interface circuit 112 are also connected a motor relay 113 for making an on/off control of the discharge lamp 10, separating charger 20, charge removal charger 26 and motor 28, a heater relay 114 for controlling a heater of the heat roller 23, a development roller clutch 115 for controlling a development roller of the developer 12, a toner replenishing solenoid 116 for controlling a toner replenishing roller of the developer 12, a paper feed clutch 117 for controlling the paper feed roller 15, a paper start clutch 118 for controlling the aligning rollers 17, and a heat roller solenoid 119 for controlling a pressure-roller section of the heat roller 23, respectively. The output interface circuit 112 is intended to drive the external appliances in response to the various control signals outputted from the microprocessor 100.

Further, to the microprocessor 100 is connected a latch circuit 120, to which are connected, through an output interface circuit 121 for driving the external appliances, the document stopper solenoid 52, document feed clutch 69, document feed clutch 61, and a document stopper solenoid 122 for controlling the document stoppers 40, respectively. Further, the output interface circuit 121 is also designed to produce a sorting signal $S_1$ for causing the copy sorter 1B to carry out the sorting operation and a motor control signal $S_2$ for controlling a drive motor (not shown) of the copy sorter 1B, the sorting signal $S_1$ and motor control signal $S_2$ being both supplied from the microprocessor 100 through the latch circuit 120 to the output interface circuit 121.

Further, to the microcprocessor 100 is connected a shift register 123 for causing the dispalying operation to be carried out. To this shift register 123 are connected, through an output interface circuit 124 for causing the displaying operation to be carried out, a preset sheet number display unit 93 and a copying sheet number display unit 94, and are also connected, through an output interface circuit 125 for causing the displaying operation to be carried out, the interrupt display lamp 95a, status display section 98 and sorting display lamp 99a.

Figure 9:
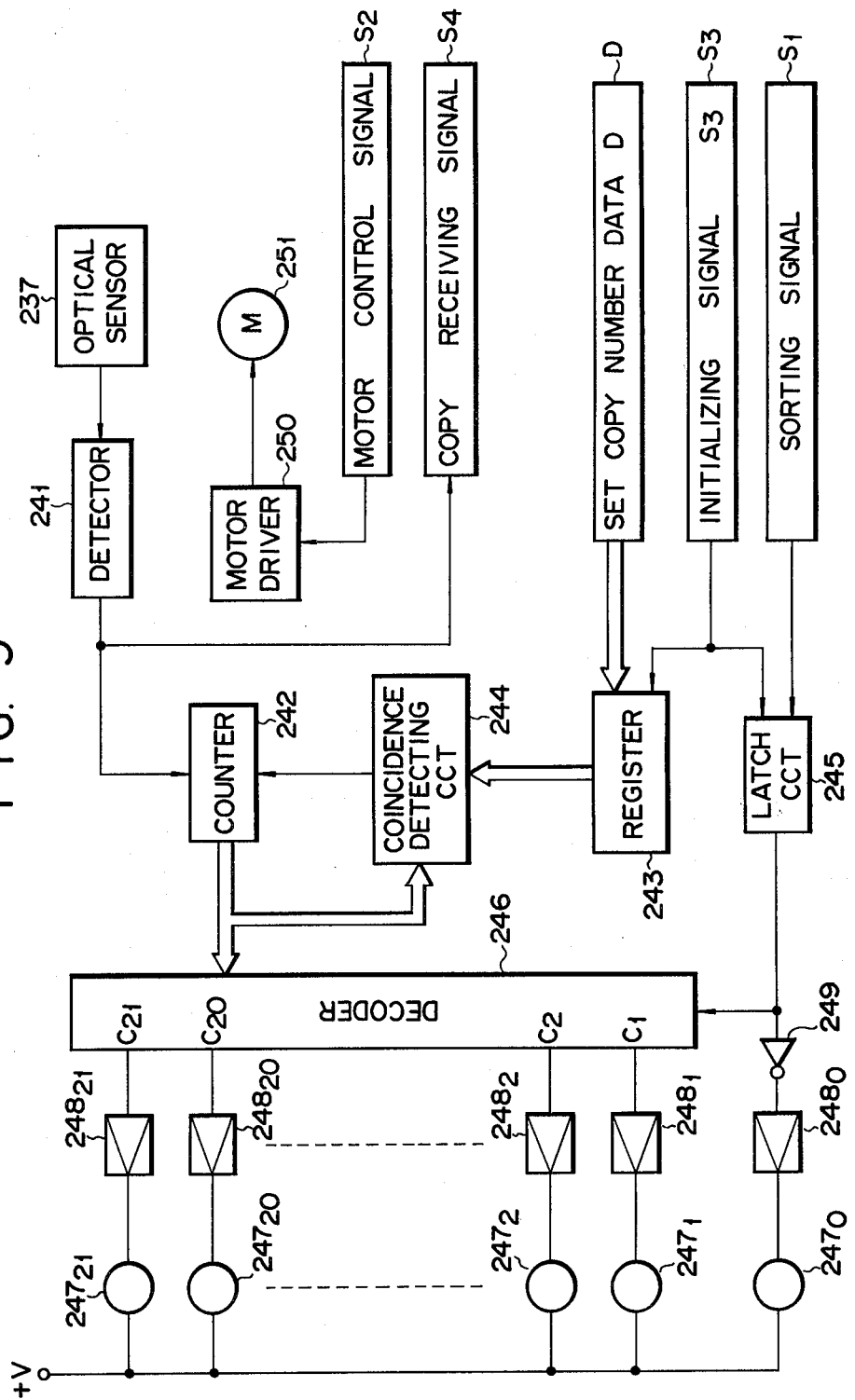
FIG. 9 is a block circuit diagram of an automatic copy sorter.

Further, to the microprocessor 100 is connected a shift register 126 for the data transfer, in which is stored a set copy number data D the same as that display data of the paper sheet number display unit 93 which is supplied from the microprocessor 100, the set copy number data D being transferred to the control system for the copy sorter 1B (see FIG. 9). The data storage into the shift register 126 is carried out in synchronization with that initializing signal $S_3$ for initializing the control system for the copy sorter 1B which is outputted from the microprocessor 100.

Now, the outline of the signal or data receiving and delivering operation of the microprocessor 100 will be explained. CPU 101 sequentially reads out the program stored in ROM 102 and executes predetermined sequence processing operations in accordance with the program thus read out and makes the resulting necessary input/output controls. During this period of time, the various signals or data required between CPU 101 and the various copy processing sections or control panel are received or delivered by CPU 101 through the interface circuits 105 and 112. That is, CPU 101 reads, in accordance with the program read out from ROM 102, the status signals or data supplied from the various copy processing sections and operating panel to IOC 104 through the interface circuit 105, discriminates the status signals or data and thereby executes the program, and thus generates the resulting various control signals or data, through IOC 104, to the interface circuit 112, shift register 123, latch circuit 120, and shift register 126. Further, CPU 101 carries out various internal data processing operations and stores the resulting data into RAM 103, or reads out the data stored in RAM 103 as required.

FIG. 9 schematically shows the control system for the copy sorter 1B, and this control system is as follows. A detector circuit 241 detects, in response to the output from the light receiving element or optical sensor 237 (see FIG. 1), that the copy paper has finished passing through the entrance portion of the tray, and thus generates a copy receiving signal $S_4$. The copy receiving signal is supplied to the input interface circuit 105 in the main control system of FIGS. 8A and 8B. Upon receipt of the copy receiving signal $S_4$, a sorter counter 242 counts the number of copy sheets received or stocked in the tray. A preset copy number register 243 stores the preset copy number data D transferred from the main control system of FIGS. 8A and 8B. A coincidence detecting circuit 244 compares the content of the sorter counter 242 with that of the register 243 and, when the both contents have coincided with each other, generates a coincidence signal to the sorter counter 242. A latch circuit 245 latches a sorting signal transferred from the main control system of FIGS. 8A and 8B. A decoder 246, when the sorting signal $S_1$ is latched in the latch circuit 245, starts to operate and decodes the content of the sorter counter 242 to generate decode signals $C_1$ to $C_{21}$. Solenoid $247_0$, $234_1$ to $247_{21}$ operate to drive and displace the regulating pawls $234_0$, $234_1$ to $234_{21}$, respectively. Drive circuits $248_1$ to $248_{21}$ respectively drive the solenoids $247_1$ to $247_{21}$ in response to the output signals $C_1$ to $C_{21}$ from the decoder 246, while a drive circuit 248 operates in response to the output signal from the latch circuit 245 to drive the solenoid 247. A motor controlling circuit or motor driver 250, in response to the motor control signal $S_2$, controls a motor 251 for driving a carry section of the copy sorter 1B.

Figures 10, 11, 12:
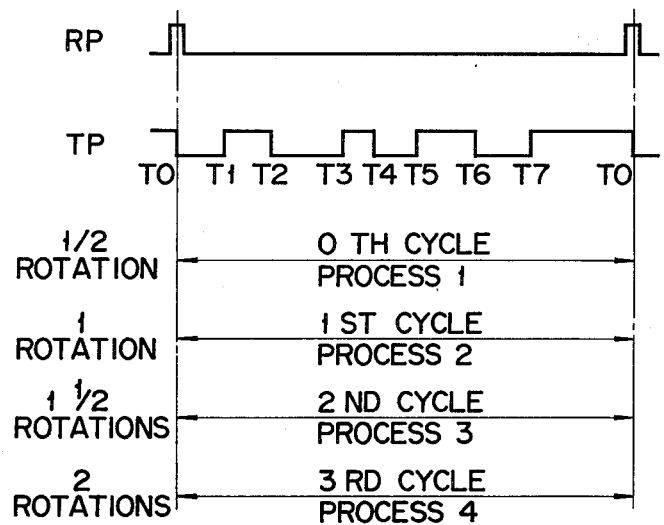
FIG. 10 is a time chart for explaining the operation of the copying apparatus shown in FIG. 1.
FIG. 11 is a view showing the state of registers at the time of obtaining one copy.
FIG. 12 is a view showing the state of registers at the time of obtaining two continuous copies.
Figure 13A:
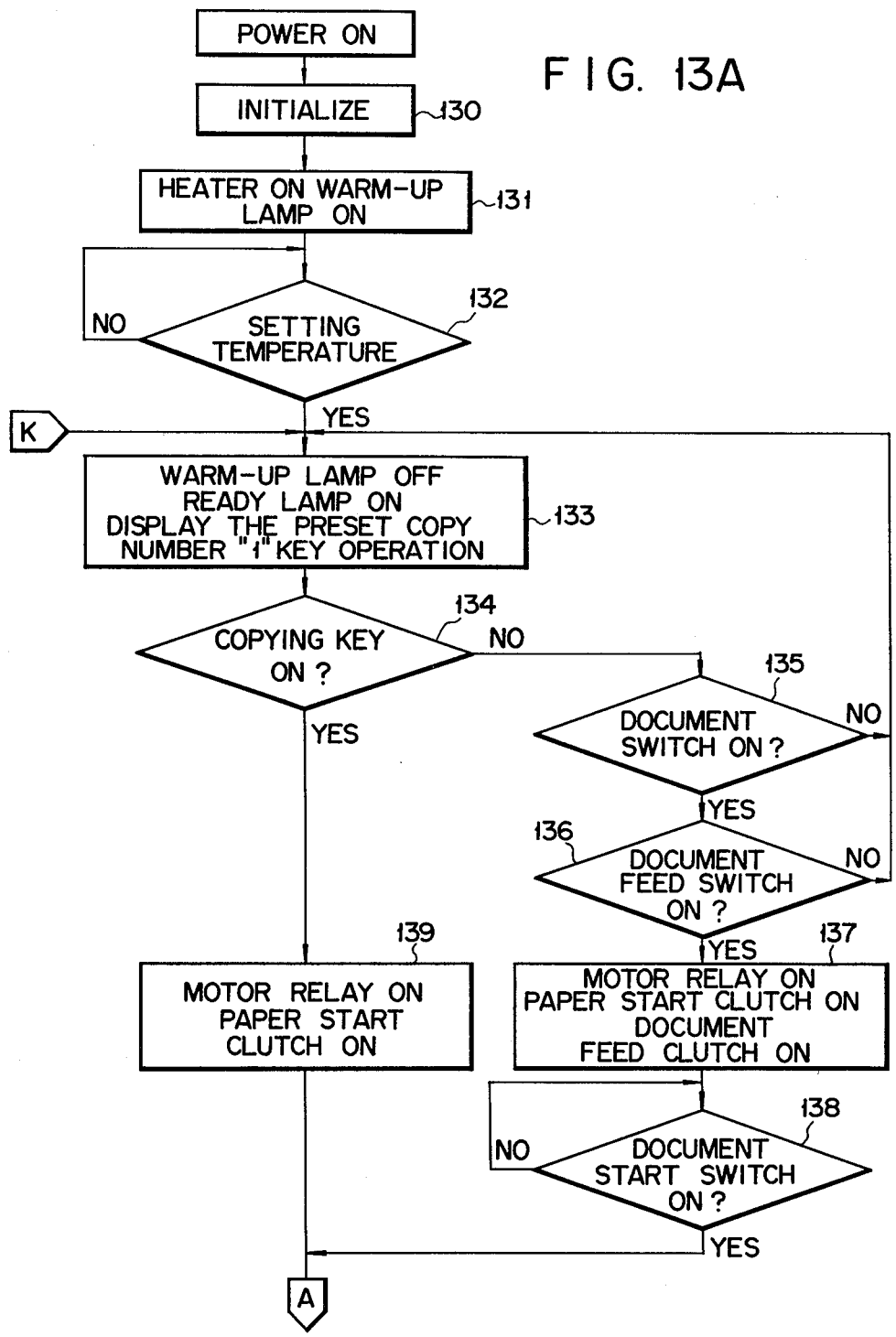
Figure 13B:
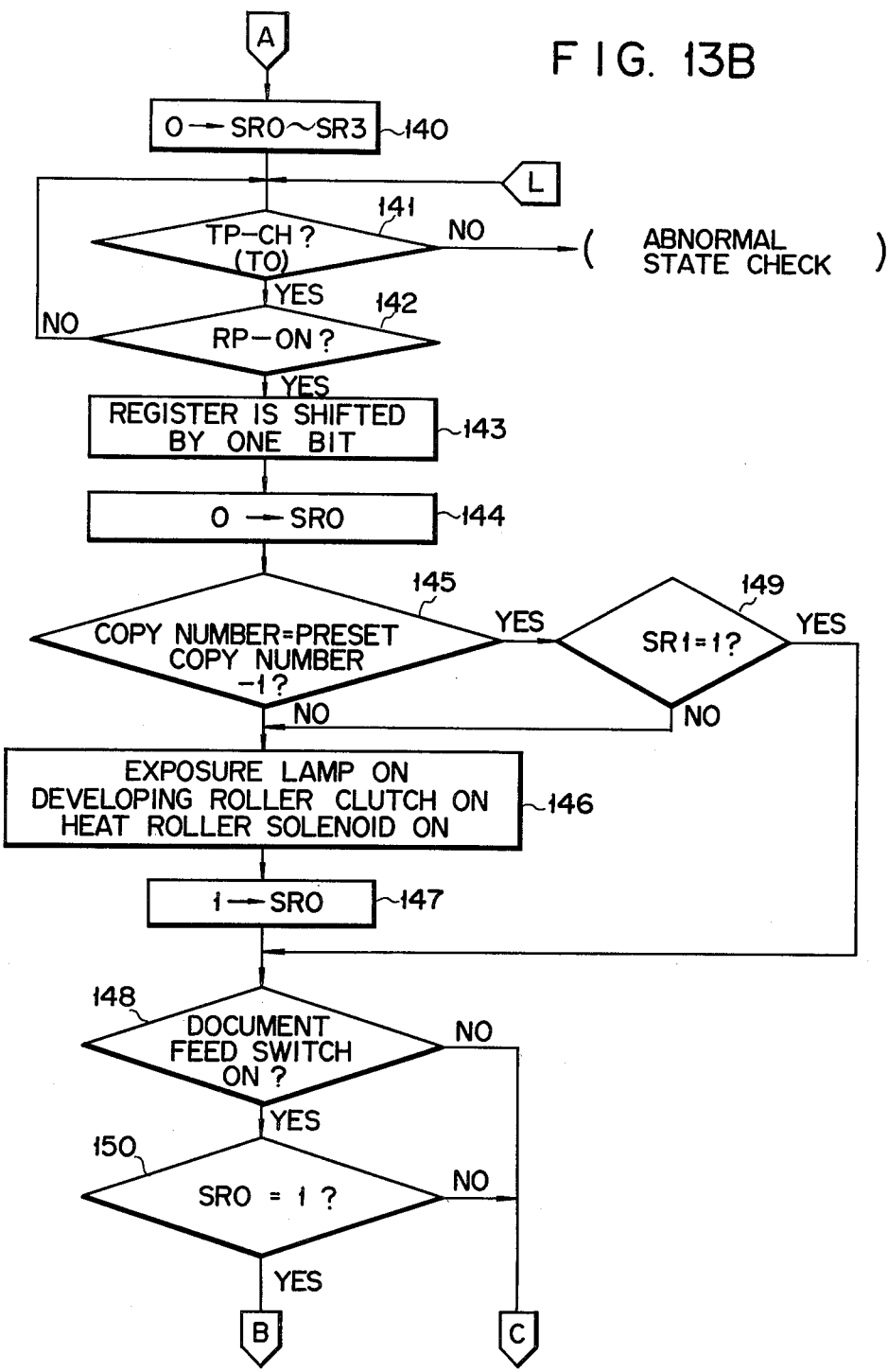
Figure 13C:
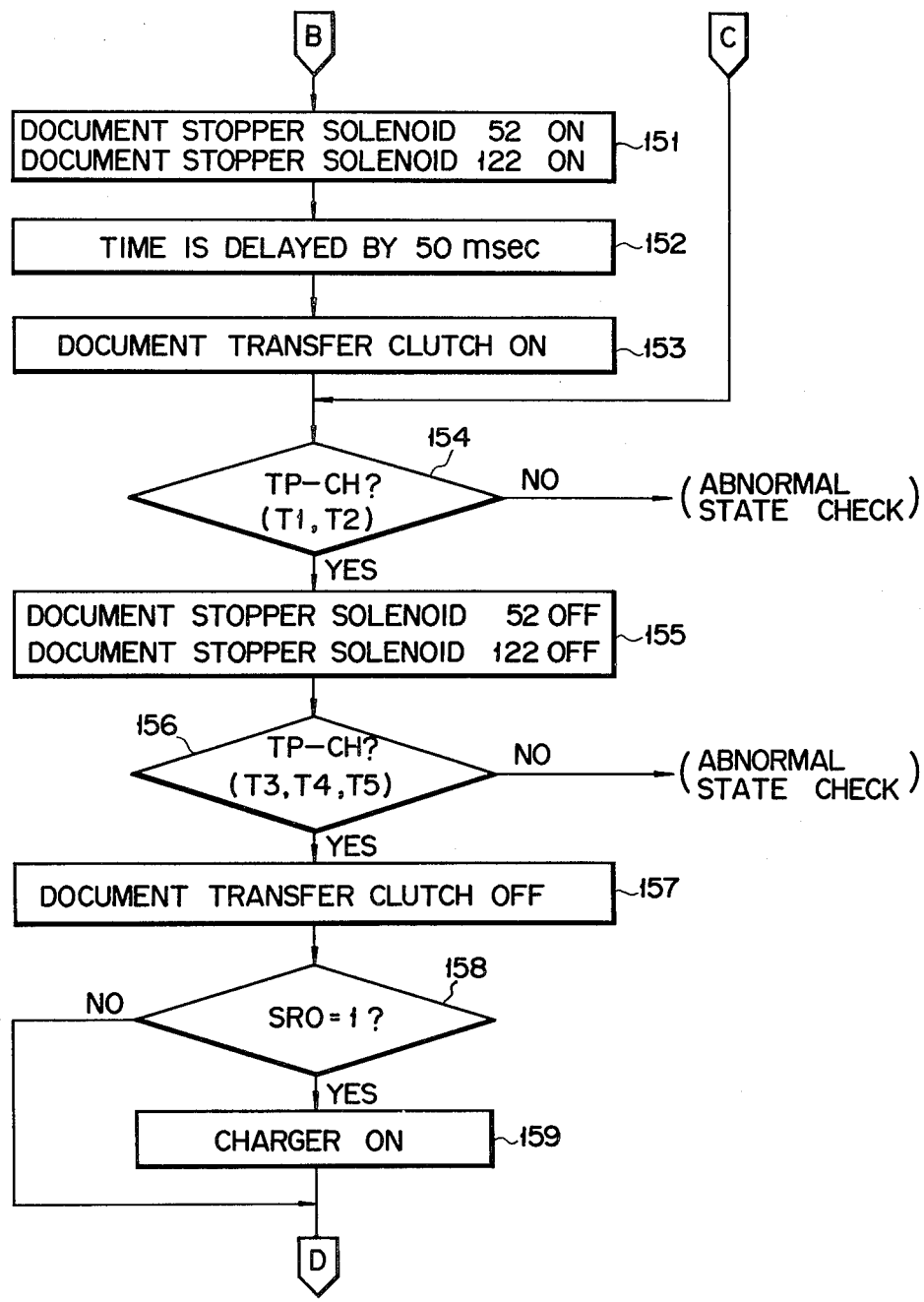
Figure 13D:
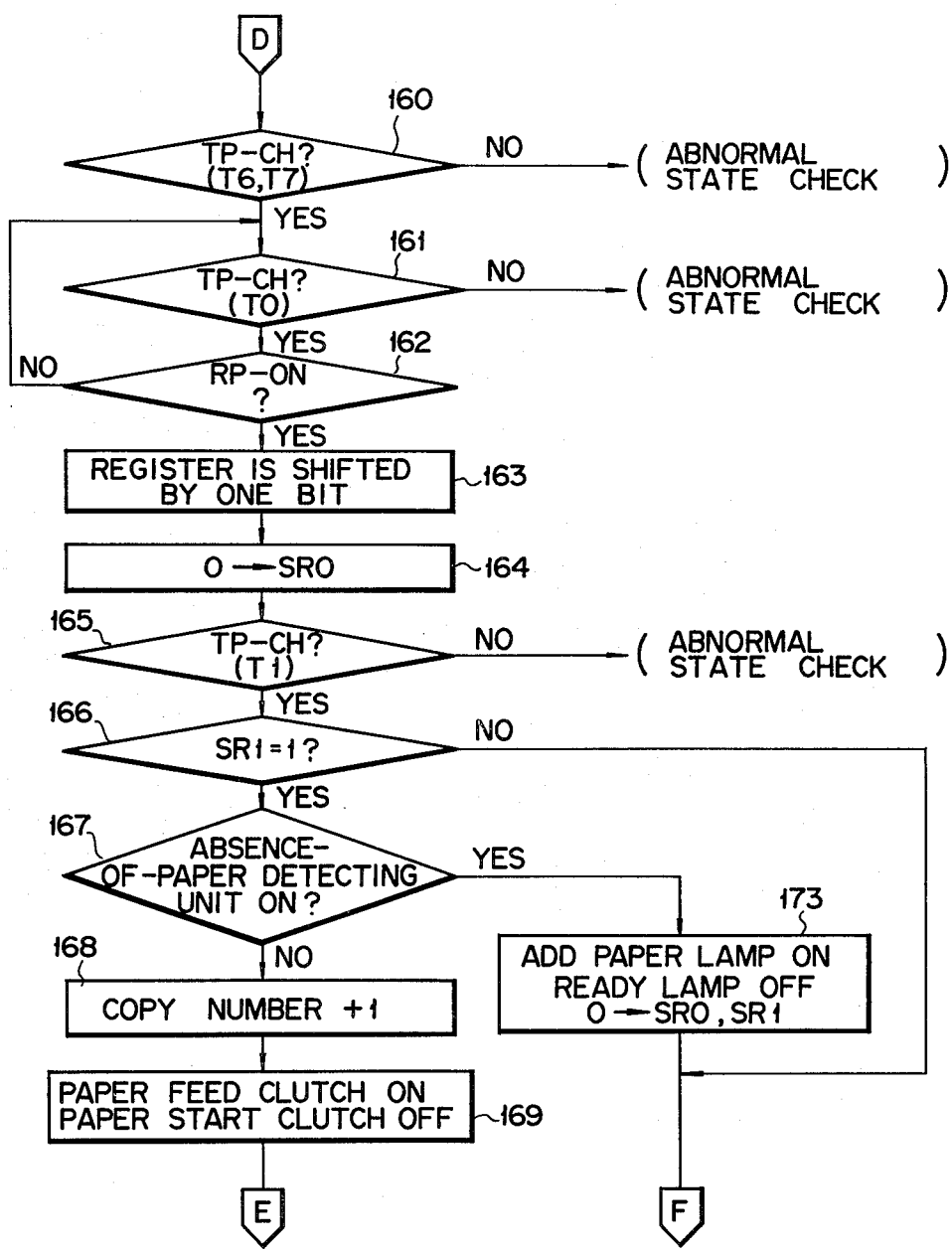
Figure 13E:
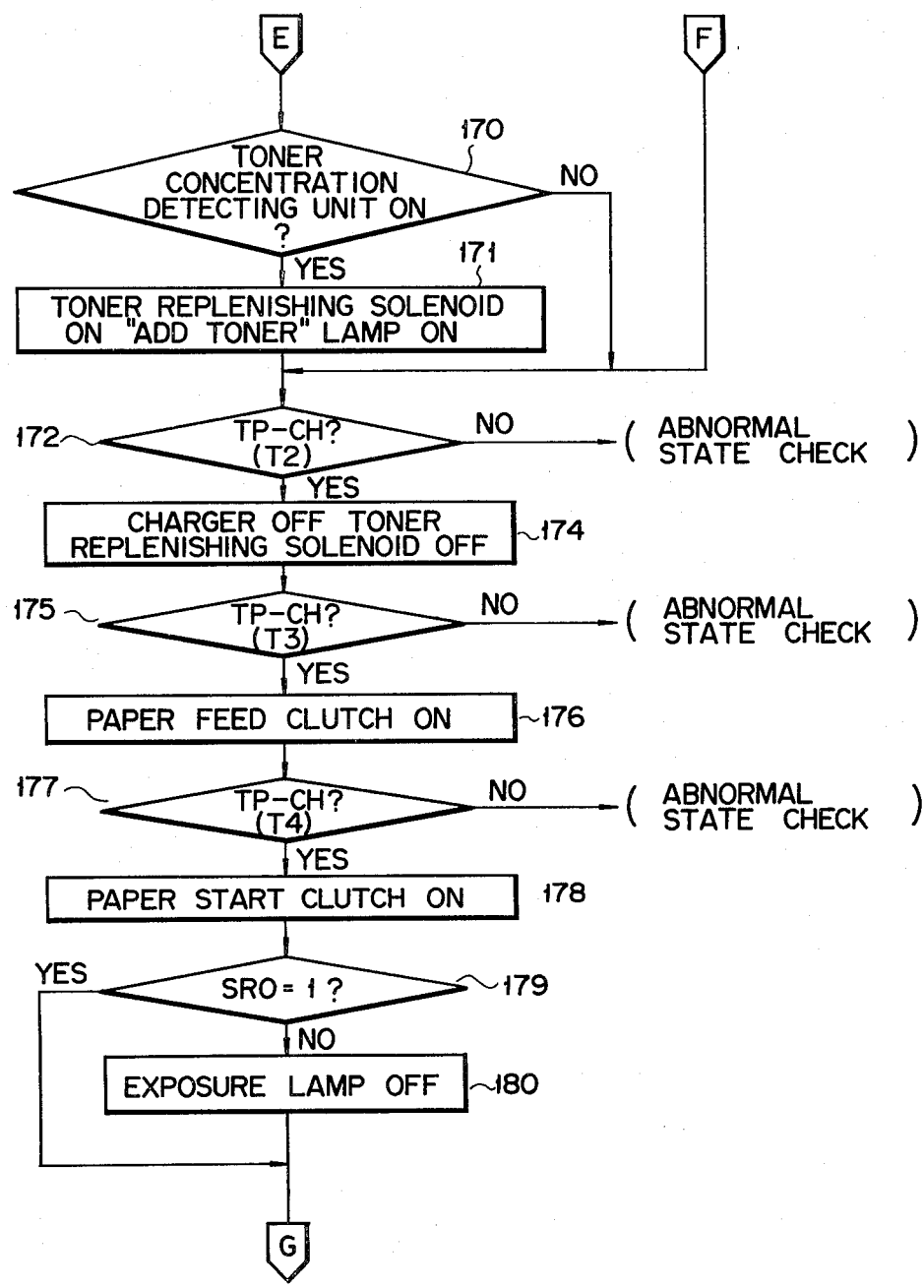
Figure 13F:
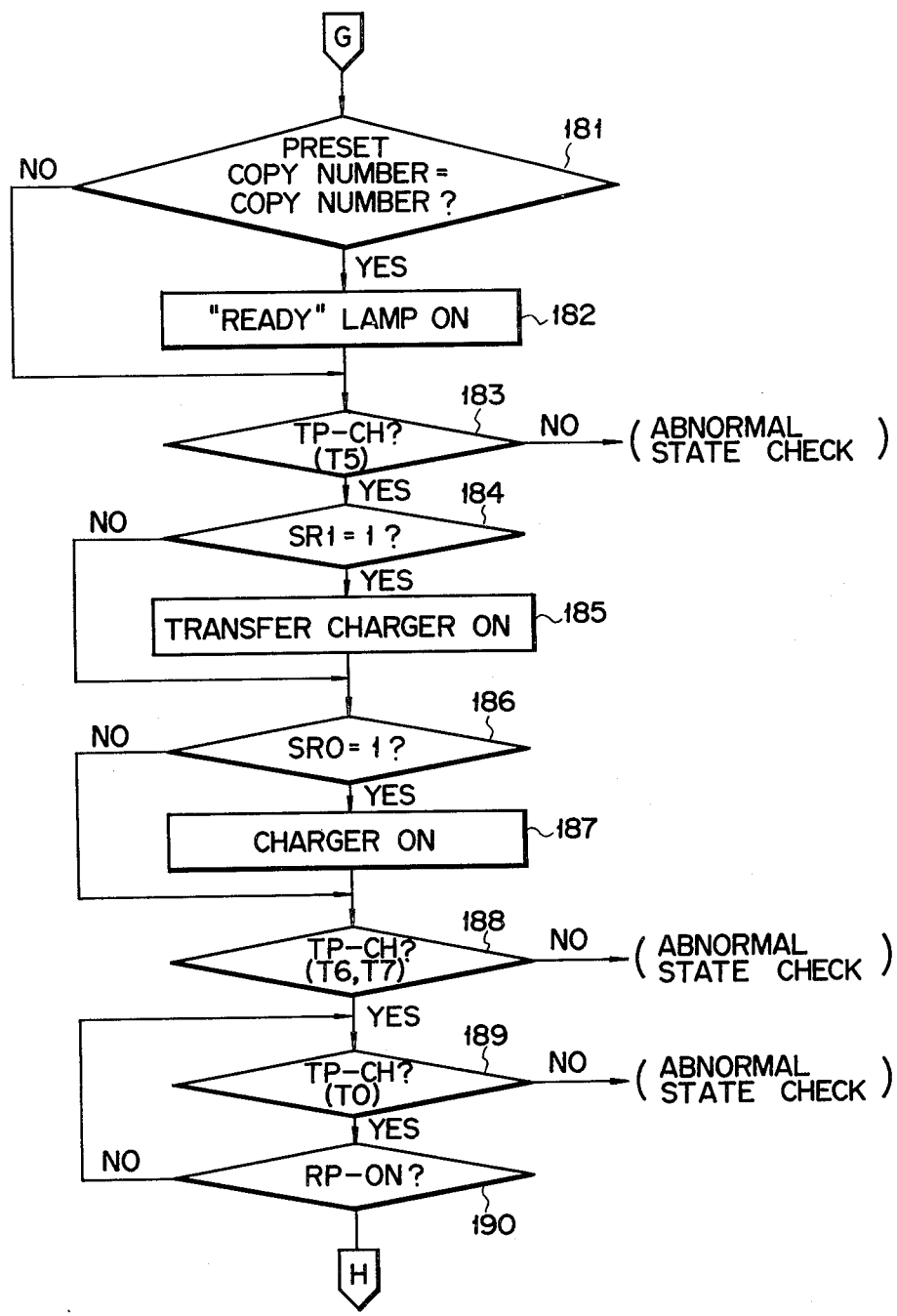
Figure 13G:
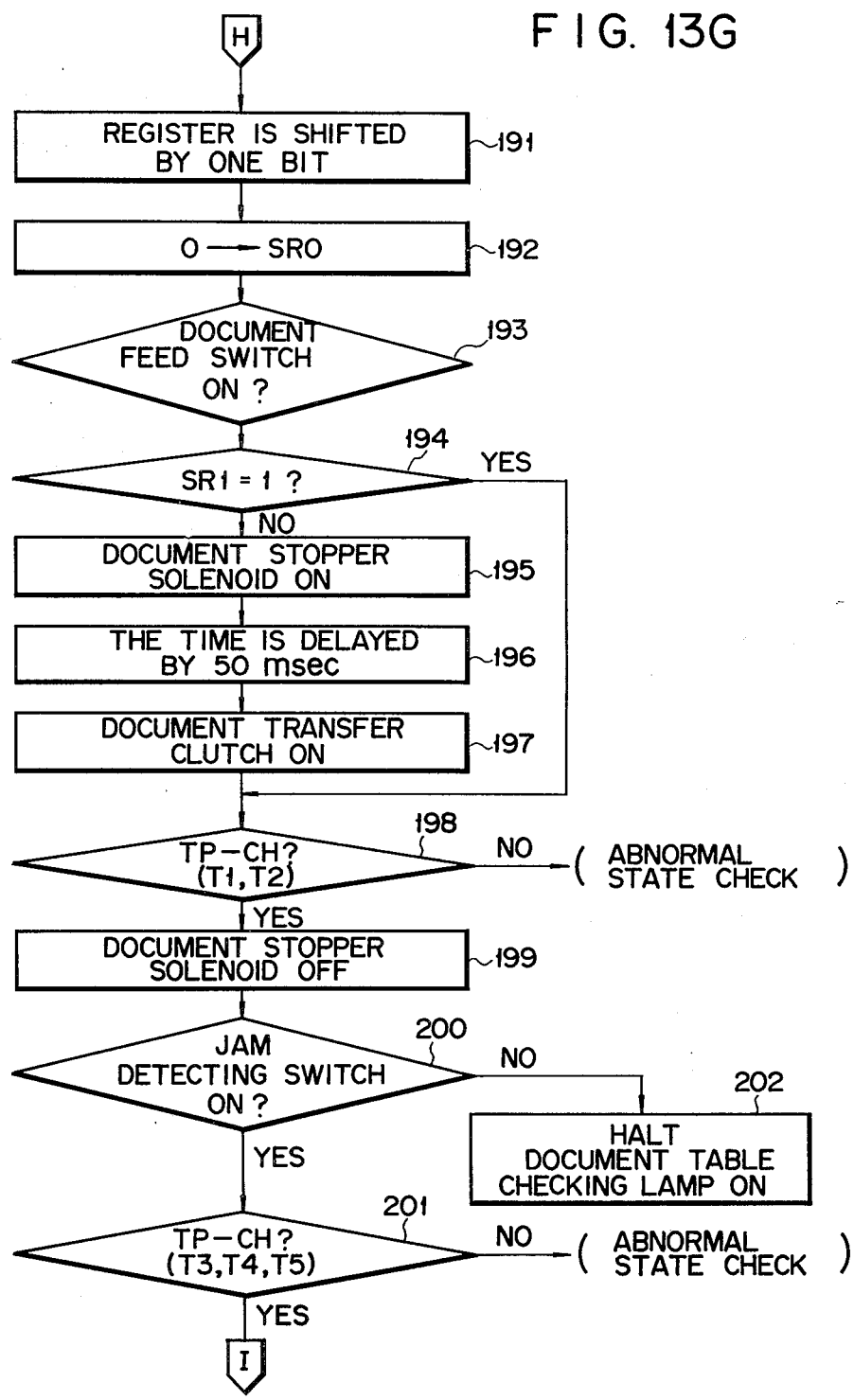
Figure 13H:
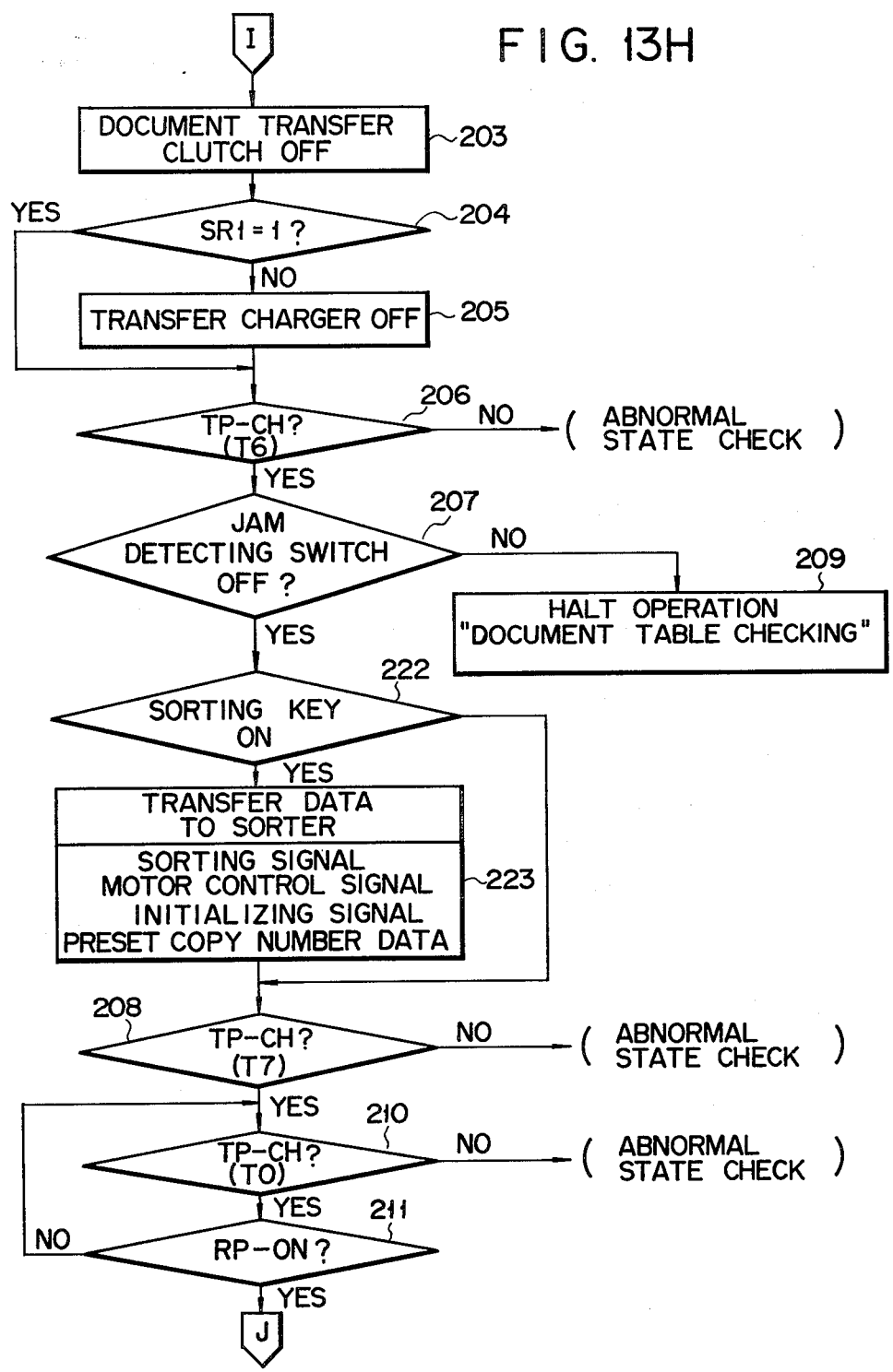

Next, the operation of the copying apparatus having the above-mentioned construction will be explained. First, the control system based on the use of the timing disc 78 which is counted among the characterizing features of the invention will be briefly explained. In the present invention, all the processing step operations involved in the copying operation are controlled in accordance with the position of an optical member, i.e., the rotational position of the timing disc 78 connected directly to the photoconductive drum 9. That is, when the photoconductive drum 9 is allowed to rotate, then the timing disc 78 is also allowed to rotate, accordingly. In this embodiment, the photoconductive drum 9 makes two rotations with respect to obtaining one copy, and the timing disc 78 also makes two rotations, accordingly. Therefore, since the timing disc 78 is shaped as mentioned above, each time the timing disc 78 makes a one half rotation, such a timing signal RP (hereinafter referred to as "reset pulse") as shown in FIG. 10, is obtained from the optical sensor 87 and such a timing signal TP as shown in FIG. 10 is obtained the optical sensor 88. Thus, the microprocessor 100, reading thereinto the reset pulse RP and timing signal TP, executes various processing steps with the timings of the timing signal TP taken in accordance with the reset pulse RP. More in detail, as shown in FIG. 10, the points of variation (leading portion, trailing portion) $T_0$ to $T_7$ of the timing signal TP are sequentially checked in accordance with the reset pulse RP. Each time the reset pulse RP is detected, one processing cycle is executed with a timing with which one of the points of variation $T_0$ to $T_7$ of the timing signal TP is checked. In the embodiment, four processing cycles are executed with respect to obtaining one copy. For example, when it is now assumed that the first ½ rotation of the timing disc 78 corresponds to the 0th cycle, the second ½ rotation or one rotation thereof corresponds to the 1st cycle, the third ½ rotation or one and a half rotation thereof corresponds to the 2nd cycle, and the fourth ½ rotation or two rotations thereof correspond to the 3rd cycle, then the processing steps (1), (2), (3) and (4) constituting one copying process are executed in the 0th, 1st, 2nd and 3rd cycles, respectively. Note here the following. That is, in order to read which of the four processing cycles is executed after the commencement of the copying process, a shift register SR of the bits corresponding in number to the processing cycles necessary for one copying process is provided at a specified region of RAM 103 shown in FIG. 8A. In this embodiment, since the number of the processing cycles is four, the shift register SR of four bits ($SR_0$ to $SR_3$) is provided. Each time the copying process is started, the first bit $SR_0$ is set, and, for each processing cycle, the content of the shift register SR is shifted. That is, the 0th cycle corresponds to the 0th bit $SR_0$, the 1st cycle to the 1st bit $SR_1$, and the succeeding cycles, similarly, to the succeeding bits, respectively. That is, when the 0th bit is set ($SR_0=1$), the processing step (1) corresponding to the 0th cycle is executed. When 1st bit is set ($SR_1=1$), the processing step (2) corresponding to the 1st cycle is executed. The succeeding processing steps (3) and (4) are similarly executed. In FIG. 11, the correspondence of the copying cycles to the shift registers SR at the time of obtaining one copy, while in FIG. 12 such correspondence at the time of obtaining two continuous copies.

Hereinafter, the sequence control of the copying operation of the invention will be explained in detail with reference to the flow charts shown in FIGS. 13A to 13I.

When it is now assumed that a power switch not shown is closed or made on, CPU 101 in step 130 initializes the operation and the program advances to step 131. In the step 131, the heater relay 114 is made "on" with a result that a current is allowed to flow in a heater of the heating roller section of the heat roller 23. Thus, the heat roller 23 starts to be heated. At this time, a warm-up lamp $98_1$ ("wait") of the status display section 98 is made "on" or lit. In step 132, it is checked whether or not the setting temperature of the heat roller 23 is reached. When the result or answer is "yes", the heater relay 116 is made "off". Note here that after the setting temperature is reached, the heater relay 114 is repeatedly made "on" or "off" in accordance with the temperature of the heat roller 23, thereby maintaining the heat roller 23 at a constant temperature. In step 133, the warm-up lamp $98_1$ is made "off" and a "ready" lamp $98_2$ ("ready to copy") of the status display section is made "on". Simultaneously, "1" is displayed on the preset copy number display unit 93 and any key of the control panel is made ready to receive the actuation. When in step 133 "1" is displayed on the preset copy number display unit 93 or any key of the ten-key unit 91 is actuated, the program advances to step 134 in which it is checked whether or not the copying key 90 is made "on". Since at this time the copying key 90 is not yet made "on", the program advances to step 135, in which it is checked whether or not the document switch 106 is made "on". When the answer is "no", the program goes back to the step 133. When the answer is "yes", the program goes ahead to step 136, in which it is checked whether or not the document feed switch 74 is made "on". Since at this stage of operation the switch 74 is not yet made "on", the program goes back to the step 133. In this way, while the operational status is kept "ready", the steps 133 to 136 are repeatedly carried out. Thus, the apparatus is kept awaiting the key actuation.

In the "ready" status, the copy number setting operation may be carried out by actuation of the ten-key unit 91, or the toner concentration setting operation for the document may be carried out by actuation of the toner concentration setting key 96, or other setting operations may be carried out. When in the "ready" status the automatic document feeder 1C is actually closed over the document table 2 and the document 41 is loaded thereonto from the document guide member 42, the document switch 106 and document feed switch 74 are both made "on", with a result that the program goes ahead to step 137 from the step 136. In step 137, the motor relay 113, paper start clutch 118 and document feed clutch 69 are made "on", respectively, advancing to step 138. When the motor relay 113 is made "on", the discharge lamp 10, separating charger 20, charge removal charger 26 and motor 28 are allowed to operate, respectively. When the motor 28 is thus driven, it is followed by the rotation of the photoconductive drum 9, the reciprocating movements of the exposure lamp 5 and lens 6, and the respective rotations of the turn roller 21, the heating roller section of the heat roller 23 and the paper discharge roller 24. When the paper start clutch 118 is made "on", the aligning roller 17 is allowed to operate. When the document feed clutch 69 is made "on", the inclined roller 53 is allowed to operate. When the inclined roller 53 is allowed to operate, the tip ends of the document 41 loaded as above are aligned and, while those tip ends are being aligned, the document 41 is carried to the stop lever 50 and is temporarily stopped at this position. The document start switch 75 is thus made "on". In step 138, it is checked whether or not the document start switch 75 is "on". If the result or answer is in the affirmative, the following copying operation is carried out. Note here that when in the "ready" status the copying key 90 is made "on", the program goes ahead from step 134 to step 139. In the step 139, the motor relay 113 and paper start clutch 118 are made "on", thus to perform the following copying operation. In this case, however, the automatic document feeder 1C is not used and therefore the document feed clutch 69 does not become "on".

When it is now assumed that the copying operation has started due to the "on" operation of the document start switch 75, then the program goes ahead from step 138 to step 140. In step 140, the content of the shift register SR is cleared, and the next step 141 is executed. In step 141, the checking operation (TP - CH) for the timing signal TP is carried out and the point of variation $T_0$ is discriminated. When at this time the point of variation $T_0$ fails to be discriminated, the program goes into a check routine for the abnormal state, the mechanical operations being halted. Where the descriptions hereinafter made of the checking operation for the timing signal TP refer to the failure to discriminate the point of variation thereof, similar operations are carried out and therefore descriptions thereof are omitted. In step 142, detection (RP - CH) is made of the reset pulse RP. When the reset pulse RP is not detected, the program returns to step 141, the operations from step 141 to 142 being repeated. When the reset pulse RP is detected, the program goes ahead to step 143, in which the shift register SR is shifted by one bit, advancing to step 144. In step 144, "0" is set into the 0th bit $SR_0$ of the shift register SR, the program advancing to step 145. In step 145, it is checked whether or not "the copy number=the preset copy number $-1$". If both are not equal, the program goes ahead to step 146. In this step, the exposure lamp 5, developing roller clutch 115 and heat roller solenoid 119 are respectively made "on", thus advancing to step 147. Upon the "on" operation of the developing roller clutch 115, the developing magnet roller of the developer 12 starts to rotate. Upon the "on" operation of the heat roller solenoid 119, the pressure-roller section of the heat roller 23 is brought into rolling contact with the heating roller section thereof. In step 147, "1" is set into the 0th bit $SR_0$ of the shift register SR, the program advancing to step 148. When in the step 145 the "equal" judgement was made, the program advances to step 149 in which it is checked whether or not the 1st bit $SR_1$ of the shift register SR is set at "1". As a result, if this 1st bit is not set at "1", the program goes ahead to step 146. If that bit is set at "1", then the operation jumps the steps 146 and 147 to step 148.

In step 148, it is checked whether or not the document feed switch 74 is made "on". If it is made "on", the program advances to step 150, in which it is checked whether or not the 0th bit $SR_0$ of the shift register SR is set at "1". In this case, if the result is in the affirmative, the program advances to step 151. In step 151, the document stopper solenoids 52 and 122 are respectively made "on", going to step 152. When the solenoid 52 is made "on", the temporary stoppage of the document 41 by the stop lever 50 is released. Thus, the document 41 is delivered between the document table 2 and the conveyer belts 38 by the inclined roller 53. In step 152, the time is delayed by 50 m sec, the program advancing to step 153. In this step, the document transfer clutch 61 is made "on", the program going ahead to step 154. Upon the "on" operation of this clutch 61, the conveyer belts 38 start to operate, thus the document 41 is fed onto the document table 2. At this time, when the preceding document remains to stay on the document table 2, the document stopper 40 is retracted from the table 2 due to the "on" operation of the solenoid 122. Thus, that preceding document is discharged into the document stocker 77. When in the step 148 the document feed switch 74 was not made "on", the program jumps the steps 150 to 153 to step 154 because of this copying operation being not based on the use of the automatic document feeder 1C. Where in the step 150 the 0th bit $SR_0$ is not set at "1", the operation made is judged not to have a timing with which the document 41 is to be fed, the program jumping the steps 151 to 153 to step 154.

In step 154, the timing signal TP is checked and the points of variation $T_1$ and $T_2$ thereof are discriminated in turn. When the point of variation $T_2$ has been discriminated, the program goes ahead to step 155. In this step, the document stopper solenoids 52, 122 are made "on", the program going to step 156. At this time, the apparatus becomes ready to receive the succeeding document 41 and, when this succeeding document 41 has been loaded or inserted, it is temporarily stopped by the stop lever 50. Thus, the apparatus is kept in the "ready" state. In step 156, the points of variation $T_3$, $T_4$, and $T_5$ of the timing signal TP are discriminated in turn, and when the point of variation $T_5$ is discriminated, the program goes to step 157. In this step 157, the document transfer clutch 61 is made "off", the program going to step 158. Upon the "off" operation of the clutch 61, the conveyer belts 38 are stopped with a result that the document 41 is stopped at its regulated position. At this time, the optical system is in a stage immediately preceding to that in which it starts the exposure. In step 158, it is checked whether or not the 0th bit $SR_0$ of the shift register SR is set at "1". If the result is in the affirmative, then the program goes to step 159. In this step, the charging charger 11 is made "on", the operation going to step 160. Upon the "on" operation of the charging charger 11, charging the surface of the photoconductive drum 19 is started and the exposure by the optical system is also started. When in the step 158 the 0th bit $SR_0$ is not set at "1", the operation made is judged not to have a timing with which the charging charger 11 is to be made "ON", the program jumping the step 159 to step 160. In the step 160, the points of variation $T_6$ and $T_7$ of the timing signal TP are discriminated in turn and, when the point of change $T_7$ has been discriminated, the program goes to step 161. In this step 161, the point of variation $T_0$ of the timing signal TP is again discriminated, the program going to step 162. In the step 162, detection is made of the reset pulse RP. When the reset pulse RP is not detected, then the program goes back to the step 161. Thus, the operations of the step 161 to the step 162 are repeated. When in the step 162 the reset pulse RP is detected, the program goes to step 163, in which the content of the shift register SR is again shifted by one bit. The program goes to step 164. At this time, by the one-bit shifting of the shift register SR, the 1st bit thereof is set at "1". In the step 164, "0" is set into the 0th bit of the shift register SR, the program going to step 165.

In the step 165, the point of variation $T_1$ of the timing signal TP is discriminated, the program going to step 166. In this step 166, it is checked whether or not the 1st bit $SR_1$ of the shift register SR is set at "1". If the result is in the affirmative, the program goes to step 167. In this step, it is checked whether or not the absence-of-copy detecting unit 107 is made "ON". If the result is in the negative, then the program goes to step 220. In the step 220, it is checked whether or not the copy receiving signal $S_4$ from the detector circuit 241 is made "on", (namely, is made to have a "1" level). If that signal is made "on", it is judged that no carry abnormality such as a paper jam occurs in the copy sorter 1B. Thus, the operation is allowed to advance to step 168. In this step, "1" is added to the content of the copy number display unit 94, the program going to step 169. In the step 169, the paper feed clutch 117 is made "on" and the paper start clutch 118 is made "off", the program going to step 170. Upon the "on" operation of the clutch 117, the paper feed roller 15 is allowed to operate. Thus, the paper feeding operation is started. Further, upon the "off" operation of the clutch 118, the aligning roller 17 ceases to operate. In step 170, it is checked whether or not the toner concentration detecting unit 111 is made "on". If the result or answer is in the affirmative, the program goes ahead to step 171. In this step 171, the toner replenishing solenoid 116 is made "on" while the toner replenishing lamp $98_3$ of the status display section 98 is made "on" or lit, the program goint to step 172. Upon the "on" operation of the solenoid 116, a specified amount of toner is replenished into the developer 12. Where in the step 170 the toner concentration detecting unit 111 is not made "on", this means that the toner-replenishing operation is unnecessary, the program thus jumping the step 171 to step 172. Further, where in the step 166 the 1st bit $SR_1$ of the shift register SR is not set at "1", the operation made is judged not to have a timing with which the paper feeding is to be carried out the program thus jumping the steps 167 to 171 to step 172. Further, where in the step 167 the absence-of-paper detecting unit 107 is made "on", this means that no paper exists in the paper feed cassette 14, making the paper feeding impossible, the program thus going to step 173. In the step 173, the "ready" lamp $98_2$ of the status display section 98 is made "off" and the "add paper" lamp $98_4$ is made "on", the program going to step 172. Further, where in the step 220 the copy receiving signal $S_4$ is not made "on", this means that any carry abnormality such as a paper jam occurs in the copy sorter 1B, the program thus going to step 221. In this step 221, the "check sorter" lamp $98_6$ of the status display section 98 is made "on", the "ready" lamp $98_2$ being made "off", the program going to step 172. In the step 172, the point of variation $T_2$ of the timing signal TP is discriminated, the program going to step 174. In this step 174, the charging charger 11 and toner replenishing solenoid 116 are respectively made "off", the program going to step 175.

In step 175, the point of variation $T_3$ of the timing signal TP is discriminated, the program going to step 176. In this step, the paper feed clutch 117 is made "off", the program going to step 177. Upon the "off" operation of the clutch 117, the copy paper 13 carried on is temporarily stopped at the aligning roller 17. In the step 177, the point of variation $T_4$ of the timing signal TP is discriminated, the program going ahead to step 178. In this step, the paper start clutch 118 is made "on", the program going to step 179. Upon the "on" operation of the clutch 118, the aligning roller 17 is allowed to operate. Thus, the copy 13 temporarily stopped thereat is again carried and sent into the transfer section. At this time, a timing is taken so as to permit the forward end of the image on the photoconductive drum 9 to coincide in position with the forward end of the copy paper 13. In the step 179, it is checked whether or not the 0th bit $SR_0$ of the shift register SR is set at "1". If it is confirmed that the answer is "no", then the program goes to step 180. In the step 180, the exposure lamp 5 is made "off", the program going to step 181. Where in the step 179 the 0th bit $SR_0$ is set at "1", the operation mode is judged not to have a timing with which the exposure lamp 5 is to be made "off", the program thus jumping, or skipping over, step 180 to step 181. In the step 181, it is checked whether or not the preset copy number and the copy number are equal. If both are equal, the program goes ahead to step 182. In this step 182, the "ready" lamp $98_2$ is made "on", the program going to step 183. At this time, the apparatus is made ready to receive the next document 41. Where in the step 181 the "equal" judgement is not made, this means that a further copying operation is needed, the program thus jumping the step 182 to step 183.

In the step 183, the point of variation $T_5$ of the timing signal TP is discriminated, the program going to step 184. In this step 184, it is checked whether or not the 1st bit $SR_1$ of the shift register SR is set at "1". If the result is in the affirmative, the program goes to step 185. In this step 185, the transfer changer 18 is made "on", the program going to step 186. Upon the "on" operation of the transfer charger 18, the toner image on the photoconductive drum 9 is transferred to the copy 13. Where in the step 184 the 1st bit $SR_1$ of the shift register SR is not set at "1", the then existing operation mode is judged to mismatch with a timing with which the transferring operation is to be carried out, the program thus jumping the step 185 to step 186. In this step 186, it is checked whether or not the 0th bit $SR_0$ of the shift register SR is set at "1". If the result is in the affirmative, then the program goes to step 187. In the step 187, the charging charger 11 is made "on", and the program goes to step 188. In the step 187, the charging charger 11 is made ready to carry out the charging operation for the next or succeeding document at the time of the continuous copying operation. Where in the step 186 the 0th bit $SR_0$ of the shift register SR is not set at "1", the operation mode is judged to mismatch with a time of charging, thus jumping the step 187 to step 188. In the step 188, the points of variation $T_6$, $T_7$ of the timing signal TP are discriminated in turn. When the point of variation $T_7$ has been discriminated, the program goes ahead to step 189. In the step 189, the point of variation $T_0$ of the timing signal TP is again discriminated, the program going to step 190. In the step 190, detection is made of the reset pulse RP. When in this step the reset pulse fails to be detected, the program goes back to step 189. Thus, the operations of step 189 to step 190 are repeatedly carried out. When in the step 190 the reset pulse RP is detected, the program goes to step 191. In this step 191, the shift register SR is again shifted by one bit, the program going to step 192. At this time, following the one-bit shift of the shift register SR, the 2nd bit $SR_2$ thereof is set at "1". In the step 192, "0" is set into the 0th bit $SR_0$ of the shift register SR, the program going to step 193.

In the step 193, it is again checked whether or not the document feed switch 74 is made "on". If the result is in the affirmative, then the program goes ahead to step 194. In the step 194, it is checked whether or not the 1st bit $SR_1$ of the shift register SR is set at "1". If the result is in the negative, the program goes to step 195. In the step 195, the document stopper solenoid 122 is made "on", the program goes to step 196. Upon the "ON" operation of the solenoid 122, the document stopper 40 is retracted. In the step 196, the time is delayed by 50 m sec, the program going to step 197. In the step 197, the document transfer clutch 61 is again made "ON", the program going to step 198. Upon the "ON" operation of the clutch 61, the conveyer belts 38 are allowed to operate. Thus, the document 41 already copied is discharged into the document stocker 77. Where in the step 193 the document feed switch 74 is not made "ON", the program jumps the steps 194 to 197 to advance to step 198. This is because of this copying operation being not based on the use of the automatic document feeder 1C as stated above. Further, where in the step 194 the 1st bit $SR_1$ is set at "1", the operation mode is judged to mismatch with the timing of discharge, the program jumping the steps 195 to 197 to go ahead to step 198. In step 198, the points of variation $T_1$, $T_2$ of the timing signal TP are discriminated in turn. When the point of variation $T_2$ is discriminated, the program goes ahead to step 199. In step 199, the document stopper solenoid 122 is made "off", the program goes ahead to step 200. In step 200, it is checked in accordance with the operational state of the jam detecting switch 76 whether or not the document 41 discharged in step 199 has reached this switch 76 within a specified range of error, or whether or not the switch 76 is made "on". If the result is in the affirmative, the program goes ahead to step 201. If that result is in the negative, it is judged that a jam of the document 41 has occurred on the document table 2 or at the discharge portion thereof, the program going ahead to step 202. In this step 202, the copying operation is halted and simultaneously the "check document-table" lamp $98_5$ of the status display section 98 is made "on".

In the step 201, the points of variation $T_3$, $T_4$ of the timing signal TP are discriminated in turn and, when the point of variation $T_4$ has been discriminated, the program goes ahead to step 203. In step 203, the document transfer clutch 61 is made "off", the program going ahead to step 204. At this time, the document 41 discharged from the document table 2 is located in the document stocker 77. In step 204, it is checked whether or not the 1st bit $SR_1$ of the shift register SR is set at "1". If the result is in the negative, the program goes ahead to step 205. In the step 205, the transfer charger 18 is made "off", the program going ahead to step 206. Where in the step 204 the 1st bit $SR_1$ of the shift register SR is set at "1", the operation mode is judged to mismatch with a timing of making the transfer charger 18 "off", the program jumping the step 205 to go ahead to step 206. In the step 206, the point of variation $T_6$ of the timing signal TP is discriminated, the program going ahead to step 207. In the step 207, it is again checked in accordance with the operational state of the jam detecting switch 76 whether or not the document 41 discharged in step 206 has passed over the switch 76 within a specified range of error, or whether or not the switch 76 in step 206 is made "off". If the result is in the affirmative, the program goes ahead to step 222. If the result is in the negative, it is judged that a jam of the document 41 has occurred, for example, at the discharge portion of the document table 2, the program going ahead to step 209. In this step 209, the copying operation is halted and simultaneously the "check document-table" lamp 985 is made "on". In step 222, it is checked whether or not the sorting key 99 is actuated. If the result is in the affirmative, the operation mode is judged to match with a timing of sorting, the program going to step 223. In the step $223_1$ the sorting signal $S_1$, motor control signal $S_2$ and initializing signal $S_3$ are transferred to the control system for the copy sorter 1B. Simultaneously, the preset copy number data D is also transferred in synchronization with that initializing signal $S_3$, the program going ahead to step 208. Where in the step 222 the sorting key 99 is not depressed, the operation mode is judged to mismatch with a timing of sorting, the program jumping the step 223 to step 208.

In the step 208, the point of variation $T_7$ of the timing signal TP is discriminated, the program going ahead to step 210. In the step 210, the point of variation $T_0$ of the timing signal TP is again discriminated, the program going ahead to step 211. In the step 211, detection is made of the reset pulse RP. When the reset pulse fails to be detected, the program goes back to the step 210. Thus, the operations of step 210 to step 211 are repeatedly carried out. When the reset pulse RP is detected, the program goes ahead to step 212. In this step $212_1$ the shift register SR is again shifted by one bit, the program going ahead to step 213. At this time, upon the one-bit shifting operation of the shift register SR, the 3rd bit $SR_3$ thereof is set at "1". In the step $213_1$ "0" is set into the 0th bit $SR_0$ of the shift register SR, the program going ahead to step 214. In the step 214, the points of variation $T_1$, $T_2$ and $T_3$ of the timing signal TP are discriminated in turn, and, when the point of variation $T_3$ has been discriminated, the program goes ahead to step 215. In the step 215, it is checked whether or not the 0th, 1st and 2nd bits $SR_0$ to $SR_2$ of the shift register SR are respectively set at "1". When any of those bits is not set at "1", the program goes ahead to step 216. In the step 216, the developing roller clutch 115 and heat roller solenoid 119 are made "off", the program going ahead to step 217. Where in the step 215 any of those bits $SR_0$ to $SR_2$ of the shift register SR is set at "1", the operation mode is judged to mismatch with a timing with which to make the clutch 115 and solenoid 119 "off". Thus, the program jumps the step 216 to step 217. In the step 217, the points of variation $T_4$, $T_5$ and $T_6$ of the timing signal TP are discriminated in turn, and, when the point of variation $T_6$ has been discriminated, the program goes ahead to step 218. In the step $218_1$ it is again checked whether or not the 0th, 1th and 2nd bits $SR_0$ to $SR_2$ of the shift register SR are respectively set at "1". When any of those bits is not set at "1", it is judged that the copying process is completed, the program going ahead to step 219. In the step 219, the motor relay 113, paper start clutch 118 and document feed clutch 69 are respectively made "off", the program going back to the step 133. Thus, the apparatus is brought to the above-mentioned "ready" status. That is, upon the "off" operation of the motor relay 113 and the clutches 118 and 69, the apparatus finishes its copying operation and thus is made ready for the next copying operation. Where in the step 218 any of the bits $SR_0$ to $SR_2$ of the shift register SR is set at "1", it is judged that a further copying operation (in case of the continuous copying operation) is required to be carried out. Thus, the program goes back to the step 141 and the succeeding steps are again carried out.

Figure 14A:
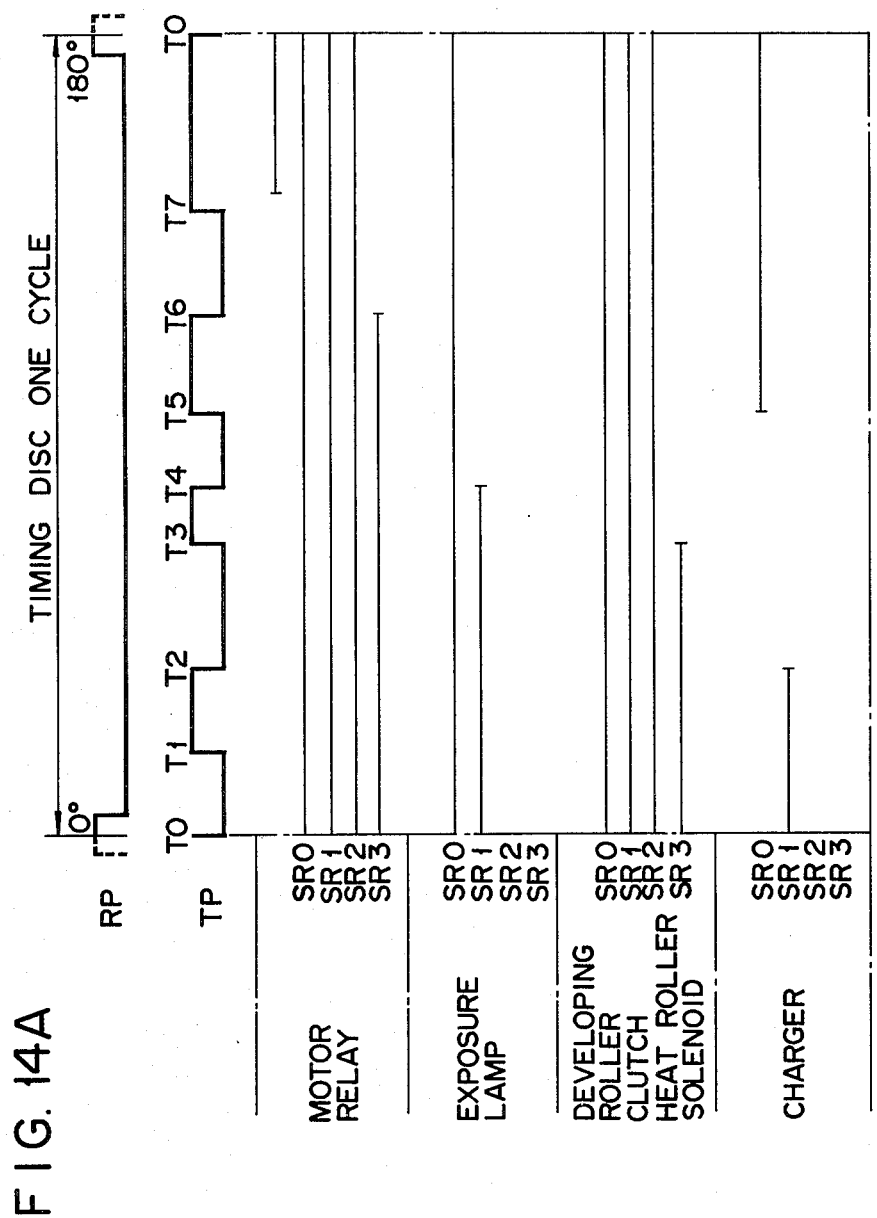
FIGS. 14A to 14C are time charts showing the timing of the operation of the copying apparatus shown in FIG. 1.
Figure 14B:
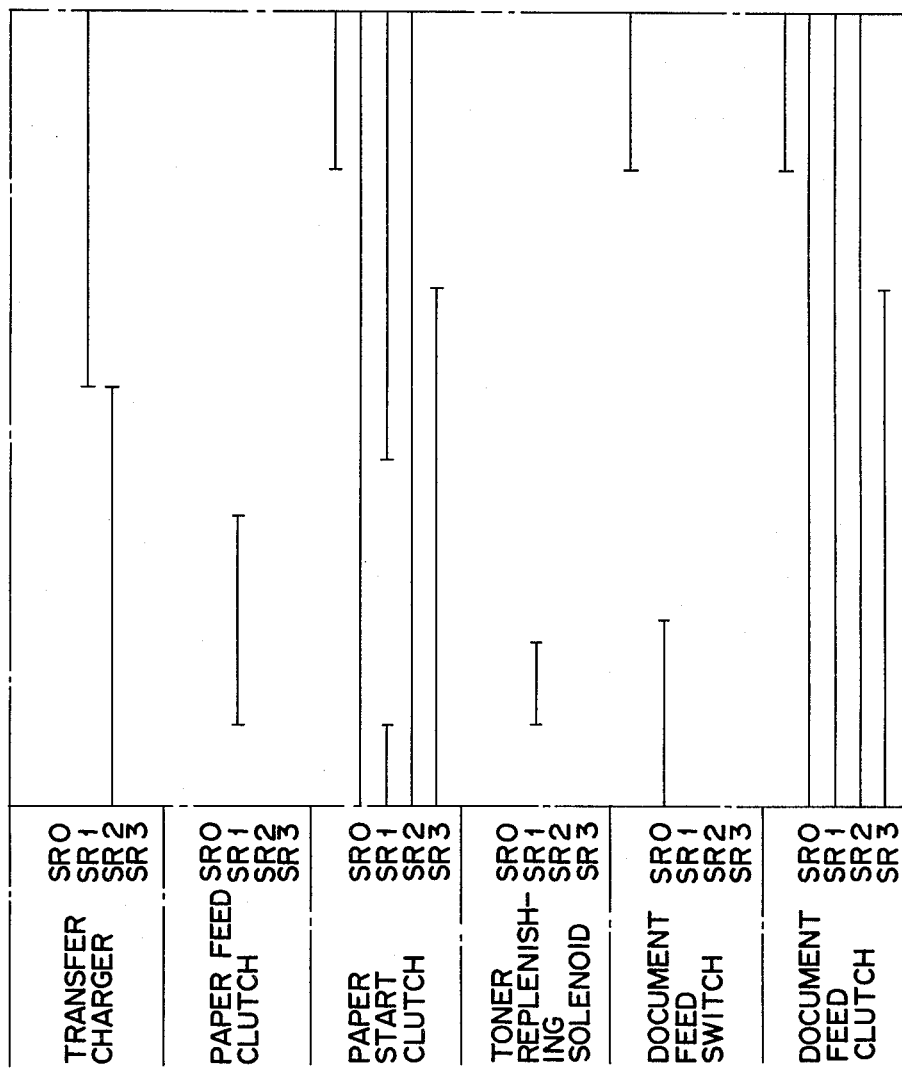
Figure 14C:
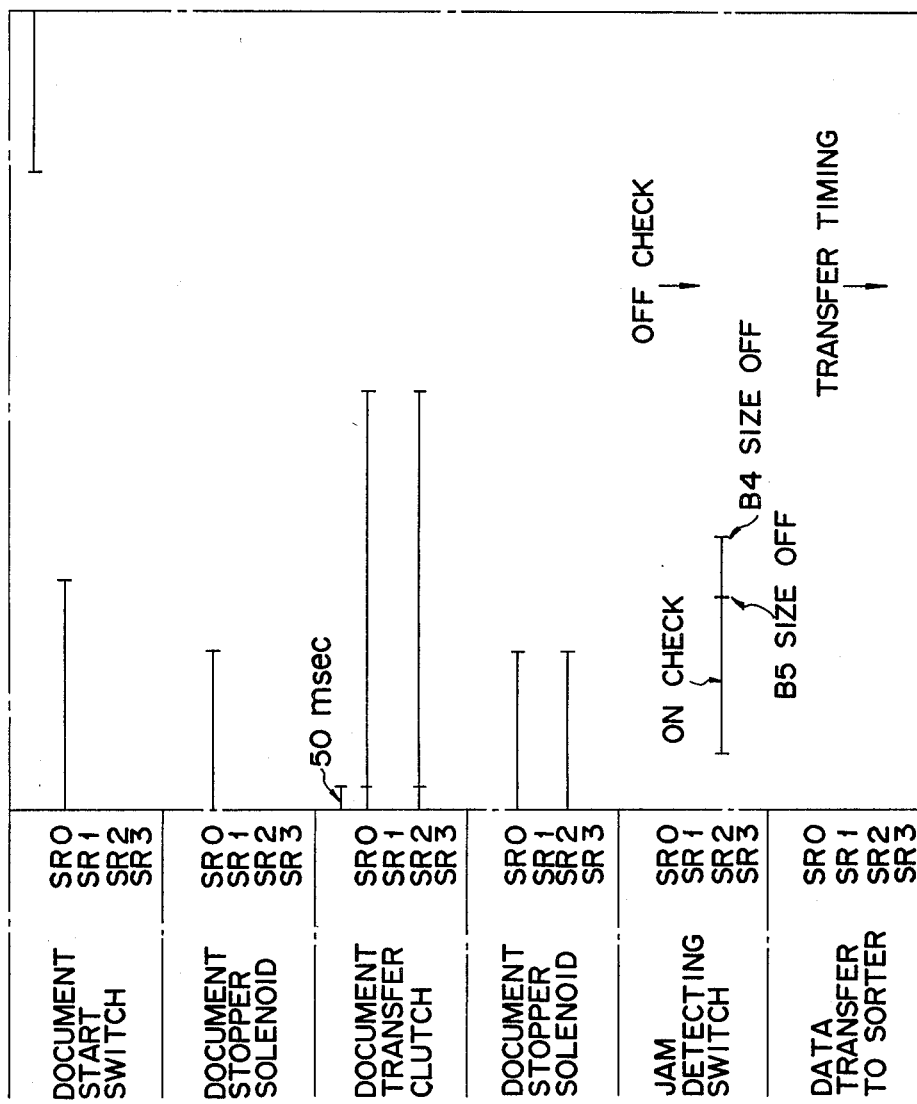

As described above, in the case of obtaining one copy for each document sheet, the respective processing parts, sections and units of the apparatus are caused to operate during the four stage movements of the optical system (namely, during the two-rotation movement of the timing disc 78). In the case of the continuous copy operation, i.e., of obtaining a plurality of copies for each document, the same operation as in the case of obtaining one copy is repeated with a delay of one cycle for each additional copy until the copying operation for a final copy is completed. Timing charts for the main part of the foregoing copying operation are shown in FIGS. 14A to 14C.

Next, the operation of the copy sorter 1B will be explained. When the sorting key 99 is depressed, the sorting signal is inputted to the microprocessor 100 through the input interface circuit 105 and is stored in RAM 103 of the microprocessor 100. When the sorting key 99 is depressed thereby achieving the sorting mode, with a timing of permitting the copy 13 to pass through the paper discharge roller 24, that is, with a timing of discriminating the point of variation $T_6$ of the timing signal TP, the microprocessor 100 transfers the sorting signal $S_1$, motor control signal $S_2$ and initializing signal $S_3$ to the control system for the copy sorter 1B and also transfers the preset copy number data D to that control system in synchronization with the initializing signal $S_3$. The motor control signal $S_2$ is inputted to the motor control circuit 250. Thus, the motor control circuit 250 drives the motor 251, thereby causing the feeder section 231, horizontal carry section 232 and vertical carry section 233 to operate, respectively. Further, in synchronization with the initializing signal $S_3$, the preset copy number data D is set to the preset copy number register 243 and the sorting signal $S_1$ to the latch circuit 245, respectively. When the sorting signal $S_1$ is set, the output of the latch circuit 245 has, for example, a "1" level. Thus, the decoder 246 is made ready to operate. When the output of the latch circuit 245 has a "1" level, the output of the inverter circuit 249 has a "0" level. Therefore, the solenoid $247_0$ is prohibited from operating. Under this sorting mode, therefore, the 0th regulating pawl $234_0$ is not driven and displaced. Accordingly, the copy 13 is not received in this 0th tray $235_0$.

Thus, the copy paper 13 discharged by the paper discharge roller 24 is carried by the feeder section $231_1$ the horizontal carry section 232 and the vertical carry section 233 in the order mentioned, passing through the 0th tray $235_0$ toward the 1st tray $235_1$ to the 21st tray $235_{21}$. The operations of the regulating pawls $234_1$ to $234_{21}$ are carried out as follows. The 1st regulating pawl $234_1$ is driven by the solenoid $247_1$, the 2nd regulating pawl $234_2$ by the solenoid $247_2$, ... and the 21st regulating pawl $234_{21}$ by the solenoid $247_{21}$, respectively in turn. The drive circuits $248_1$ to $248_{21}$ for driving these solenoids $247_1$ to $247_{21}$ are respectively driven in response to the output signals $C_1$ to $C_{21}$ from the decoder 246. In this case, the decoder 246 so operates that the drive circuit corresponding to the tray which is one in number greater than the content of the sorter counter 242 may operate. That is, since the content of the sorter counter 242 is initially "0", the decoder 246 produces the output signal $C_1$. Accordingly, the solenoid $247_1$ operates. Thus, for example, the first copy 13 with respect to the continuous copying operation for the first page of the document is received into the tray $235_1$. Since at this time the copy receiving signal $S_4$ is outputted from the detector circuit 241, the sorter counter 242 counts that copy receiving signal $S_4$. Thus, the content of the sorter counter 242 becomes "1". Then, the decoder 246 decodes this signal to produce the output signal $C_2$. Thus, the solenoid $247_2$ operates with a result that the second copy 13 is received into the 2nd tray $235_2$. Thereafter, the copies are similarly received in turn into the trays correspondingly to the contents of the sorter counter 242. Thereafter, when the content of the sorter counter 242 coincides with that of the preset copy number register 243, the coincidence detecting circuit 244 produces a coincidence signal to clear the sorter counter 242 and make the content thereof zero. Thereafter, for example, the sorting operation involved in the continuous copying operation directed to the second document is carried out in the same way as mentioned above.

Next, the processing operation, as constituting the characterizing feature of the invention, directed to the occurrence of, for example, a paper jam inside the copy sorder 1B will be explained. Assume now that during the execution of the above-mentioned steps, i.e., during the execution of the continuous copying process using the copy sorter 1B and the automatic document feeder 1C, a paper jam have occurred in the carry section of the copy sorter 1B. Then, the detector circuit 241 ceases to detect the passing of the copy 13 through the entrance portion of the tray. Therefore, the copy receiving signal $S_4$ is made continuously "off" (made continuously to have "0" level). Thus, the microprocessor 100 is informed that the paper jam has occurred. When the copy receiving signal $S_4$ is made continuously "off", the contents theretofore displayed in the preset sheed number display unit 93 and the copying sheet number display unit 94, etc. are kept intact. Thus, the paper feeding operation is halted after the continuous "off" operation of the copy receiving signal $S_4$. When at this time the document stopper solenoid 122 is further made "on" and the document feed clutch 61 is made "on", the document 41 on the document table 2 is compulsorily discharged from the same. Actually, it is checked in step 220 whether or not the copy receiving signal $S_4$ is made "on". If the result is in the negative, it is judged that a paper jam has occurred, the program going ahead to the step 221. In this step, the "check sorter" lamp $98_6$ is made "on" and the "ready" lamp $98_2$ is made "off". Thereafter, the step operations 172 and 174 to 194 are executed in turn, and in the steps 195 to 197 the compulsory-discharge operations for the document 41 are executed. Accordingly, when the paper jam has occurred inside the copy sorter 1B, it is impossible that the document 41 stays, as it then stands, inside the automatic document feeder 1C. After the copy paper 13, which was fed prior to the paper-jam occurrence inside the copy sorter 1B and the resulting continuous "off" operation of the copy receiving signal $S_4$, is completely discharged, the apparatus stops carrying out the continuous copying operation. Thus, the "check sorter" lamp $98_6$ is made "on" and the "ready" lamp $98_2$ is made "off". After the copying operation is stopped, the copy paper jammed inside the copy sorter 1B is removed. Thus, the apparatus is made "ready". Accordingly, by reloading the document 41 discharged as above the continuous copying operation is commenced.

As described above in detail, according to the invention, when the carry abnormality such as a jamming of the copy has occurred inside the copy sorter during the execution of the continuous copying operation using the copy sorter and automatic document feeder, the continuous copying operation is stopped and simultaneously the document in the automatic document feeder is compulsorily discharged on an automatic basis from the document table thereof. Thus, when it is desired to continue copying that document, it is sufficient to reload this document as it is after the processing of such abnormality in the copy sorter. This provides an extremely high convenience and operability of the present copying appartus. Furthermore, according to the invention, an operator of the apparatus is informed, by the most impressive means of document discharging operation, that such abnormality has occurred in the copy sorter. Thus, the copying apparatus according to the invention has various excellent effects.

What is claimed is:

1. A copying apparatus comprising:
   a document table set with a document;
   document feeding and discharging means for automatically feeding said document to said document table and after copying, discharging said document from said document table to a collection area;
   presetting means for presetting a copy number;
   continuous copying means for continuously copying said document by the copy number and continuously generating the resulting copies;
   sorting means for selectively sorting the copies from said continuous copying means to cause them to be received into a plurality of receiving sections;
   abnormally detecting means for detecting the abnormalities occurring in a copy conveyor passage existing from said continuous copying means to said receiving sections of said sorting means; and
   means for halting the copying operation of said continuous copying means and permitting said document set on said document table corresponding to a copy having been jammed to be automatically discharged by said document feeding and discharging means to said collection area in response to the detection of the abnormalities by said abnormality detecting means.

2. The copying apparatus according to claim 1, wherein said document feeding and discharging means is provided on said document table in such a manner that it is openable from said document table.

3. The copying apparatus according to claim 1, wherein said continuous copying means is comprised of a photoconductive drum making a continuous rotation, charging means provided approximately on the surface of said conductive drum and intended to charge this surface, exposure means for exposing the charged photoconductive surface to lights correspondingly to the contrast of the document on said document table and forming a latent image corresponding to the pattern of the document onto the photoconductive surface, means for converting the latent image into a visible image, paper feeding means for sequentially feeding paper onto the photoconductive surface, means for transferring said visible image onto one sheet of said papers, and means for fixing the visible image thus transferred of said paper.

4. The copying apparatus according to claim 1, 2 or 3, wherein said document feeding and discharging means is comprised of a drive shaft having a plurality of rollers fitted thereonto, a driven shaft having a plurality of rollers fitted thereonto and juxtaposed with said drive shaft, a plurality of belts each stretched between one of said rollers of said drive shaft and a corresponding one of said rollers of said driven shaft, and drive means connected to said drive shaft and driving said drive shaft to rotate thereby causing said belts to travel.

5. The copying apparatus according to claim 1, 2 or 3, wherein said abnormality detecting means includes paper jam detecting means for detecting the occurrence of a paper jam in the copy conveyer passage.

* * * * *